(12) United States Patent
Xu et al.

(10) Patent No.: US 11,930,520 B2
(45) Date of Patent: Mar. 12, 2024

(54) INTERFERENCE MANAGEMENT IN WIRELESS SYSTEMS

(71) Applicant: ZTE Corporation, Guangdong (CN)

(72) Inventors: Hanqing Xu, Guangdong (CN); Yajun Zhao, Guangdong (CN); Jun Xu, Guangdong (CN); Mengzhu Chen, Guangdong (CN)

(73) Assignee: ZTE Corporation, Guangdong (CN)

( * ) Notice: Subject to any disclaimer, the term of this patent is extended or adjusted under 35 U.S.C. 154(b) by 414 days.

(21) Appl. No.: 17/214,030

(22) Filed: Mar. 26, 2021

(65) Prior Publication Data
US 2021/0219304 A1    Jul. 15, 2021

Related U.S. Application Data

(63) Continuation of application No. PCT/CN2018/108144, filed on Sep. 27, 2018.

(51) Int. Cl.
*H04W 72/541* (2023.01)
*H04W 72/0446* (2023.01)

(52) U.S. Cl.
CPC ..... *H04W 72/541* (2023.01); *H04W 72/0446* (2013.01)

(58) Field of Classification Search
CPC ............. H04W 72/541; H04W 72/0446; H04J 11/0056; H04L 5/0048; H04L 5/1469; H04L 5/0073
See application file for complete search history.

(56) References Cited

U.S. PATENT DOCUMENTS

| | | | | |
|---|---|---|---|---|
| 2013/0021926 | A1* | 1/2013 | Geirhofer | H04L 5/0048 370/252 |
| 2013/0322289 | A1* | 12/2013 | Zhu | H04J 11/0056 370/252 |
| 2015/0043392 | A1* | 2/2015 | Susitaival | H04W 72/0446 370/280 |
| 2021/0306127 | A1* | 9/2021 | Sundberg | H04L 5/0048 |
| 2021/0306878 | A1* | 9/2021 | Jin | H04J 11/0056 |
| 2021/0400676 | A1* | 12/2021 | Faxér | H04L 25/0226 |

(Continued)

FOREIGN PATENT DOCUMENTS

| | | |
|---|---|---|
| CN | 103563477 | 2/2014 |
| CN | 103703704 | 4/2014 |
| CN | 105794132 | 7/2016 |

(Continued)

OTHER PUBLICATIONS

Co-Pending Korean Patent Application, Notice of Allowance for Korean Application No. 10-2021-7012469, dated Oct. 25, 2022. 9 pages with unofficial translation.

(Continued)

*Primary Examiner* — Hashim S Bhatti
(74) *Attorney, Agent, or Firm* — Perkins Coie LLP

(57) ABSTRACT

A method of wireless communication includes receiving, at a first communication node, information that includes one or more parameters indicating a time-domain characteristic of one or more interfered symbols due to a remote interference between the first communication node and a second communication node. The method also includes performing, by the first communication node, subsequent communications based on the information.

20 Claims, 20 Drawing Sheets

(56) References Cited

U.S. PATENT DOCUMENTS

2023/0143073 A1* 5/2023 Li ................. H04W 74/0866
370/329

FOREIGN PATENT DOCUMENTS

| | | |
|---|---|---|
| CN | 106535250 | 3/2017 |
| KR | 2011-0067134 | 6/2011 |
| KR | 2015-00392902 | 3/2015 |
| KR | 2019-0005988 | 1/2019 |
| KR | 2019-0094153 | 8/2019 |
| WO | 2015/040587 | 3/2015 |
| WO | 2018/045516 | 3/2018 |

OTHER PUBLICATIONS

Co-Pending Indian Patent Application, First Examination Report for IN Application No. 202147016907, dated Oct. 17, 2022, 6 pages with unofficial translation.

Co-Pending Chinese Patent Application, Second Office Action for CN Application No. 2018800979530, dated Jun. 21, 2023, 5 pages with unofficial translation.

Co-Pending Chinese Patent Application, First Office Action for CN Application No. 2018800979530, dated Sep. 5, 2022, 38 pages with unofficial translation.

European Extended Search Report for EP Application No. 18930196.3, dated Sep. 15, 2021, 7 pages.

3rd Generation Partnership Project; "Technical Specification Group Radio Access Network; Study on remote interference management for NR (Release 16)" 3GPP TR 38.866 V0.1.0 (Oct. 2018), 15 pages.

CMCC "Discussion on RS design for RIM," 3GPP TSG RAN WG 1 Meeting #94 Gothenburg, Sweden, Aug. 20-24, 2018, 12 pages.

International Search Report and Written Opinion for PCT/CN2018/108144, dated Jun. 27, 2019, 9 pages.

Yao, "Research on Atmospheric Duct Distal Interference Solution for TD-LTE," Dec. 31, 2016, 6 pages.

Co-Pending Korean Patent Application, Notice of Allowance for KR Application No. 10-2021-7012469, dated Oct. 25, 2022, 8 pages with unofficial translation.

CMCC "Discussion on RS design for RIM" 3GPP TSG RAN WG1 Meeting #94 R1-1808842 Gothenburg, Sweden, Aug. 20-24, 2018, 12 pages.

CNIPA, Notification to Complete Formalities of Registration for Chinese Application No. 201880097953.0, dated Aug. 31, 2023, 4 pages with unofficial translation.

Rule 71(3) Intention to Grant for EP Application No. 18930196.3, dated Dec. 12, 2023, 8 pages.

* cited by examiner

INTERFERENCE MANAGEMENT IN WIRELESS SYSTEMS

CROSS-REFERENCE TO RELATED APPLICATIONS

This application is a continuation of International Patent Application No. PCT/CN2018/108144, filed on Sep. 27, 2018, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for managing remote interferences caused by phenomena such as the atmospheric ducting phenomenon. The disclosed techniques allow wireless communication nodes to effectively mitigate such interference without negatively impacting the system performance.

In one example aspect, a wireless communication method is disclosed. The method includes receiving, at a first communication node, information that includes one or more parameters indicating a time-domain characteristic of one or more interfered symbols due to a remote interference between the first communication node and a second communication node. The method also includes performing, by the first communication node, subsequent communications based on the information.

In another example aspect, a wireless communication method is disclosed. The method includes transmitting, from the first communication node, information that includes one or more parameters indicating a time-domain characteristic of one or more interfered symbols due to a remote interference between the first communication node and a second communication node. The method also includes performing, by the first communication node, subsequent communications in response to the information.

In another example aspect, a wireless communication method is disclosed. The method includes observing, by a first communication node, a remote interference between the first communication node and a second communication node. The first communication node and the second communication node agree on a maximum downlink transmission boundary and a maximum uplink transmission boundary within a downlink-uplink switching period. The method also includes transmitting, by the first communication node, one or more reference signals indicating the remote interference. The one or more reference signals occupy one or more time-domain symbols before the maximum downlink transmission boundary, the one or more time-domain symbols including a downlink symbol, a flexible symbol, or a guard period symbol.

In yet another example aspect, a wireless communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of 5G wireless protocol. However, applicability of the disclosed techniques is not limited to only 5G wireless systems.

Under some weather conditions, lower densities at higher altitudes in the Earth's atmosphere cause reduced refractive index, bending signals back towards the Earth. Under such circumstances, signals can propagate in a higher refractive index layer (also referred to as the atmospheric duct) because the reflection and refraction are encountered at the boundary with a lower refractive index material. In this mode of propagation, radio signals experience less attenuation and are being guided over distances far greater than the normal radiate range. The frequency range which is usually influenced by this phenomenon is around 0.3 GHz-30 GHz.

A Time Division Duplex (TDD) system adopts the TDD duplex mode, and transmits and receives signals in the same frequency band. The uplink and downlink signals are differentiated by being transmitted in different time periods in the time domain. For example, in the Time Division Long Term Evolution (TD-LTE) frame structure, there are downlink subframes, uplink subframes, and special subframes, wherein all symbols in the downlink subframe are downlink symbols and all symbols in the uplink subframe are uplink symbols. The special subframe includes the downlink part of the special subframe, the guard period (GP), and the uplink part of the special subframe. The GP does not transmit any signal and provides protection between the uplink and the downlink symbols, thereby avoiding cross-link interference between the uplink and the downlink transmissions.

Figure 1:
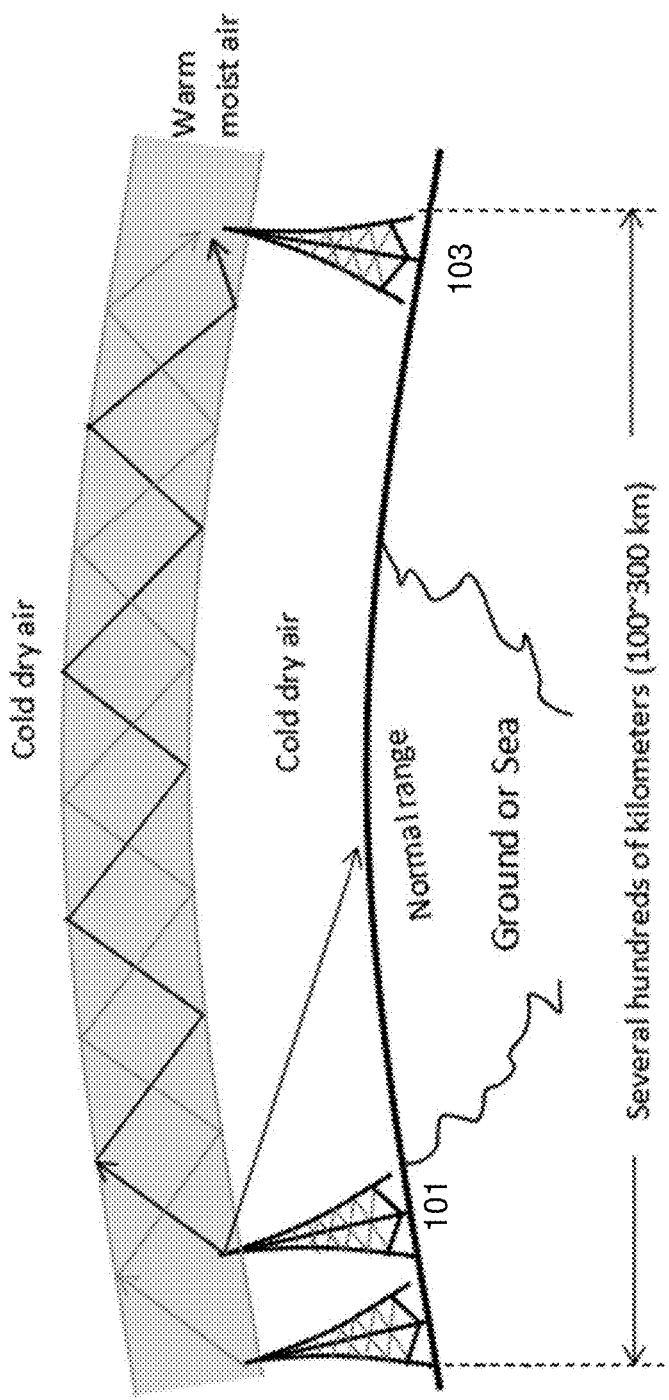
FIG. 1 shows an example of a remote interference caused by an atmospheric ducting phenomenon.
Figure 2:
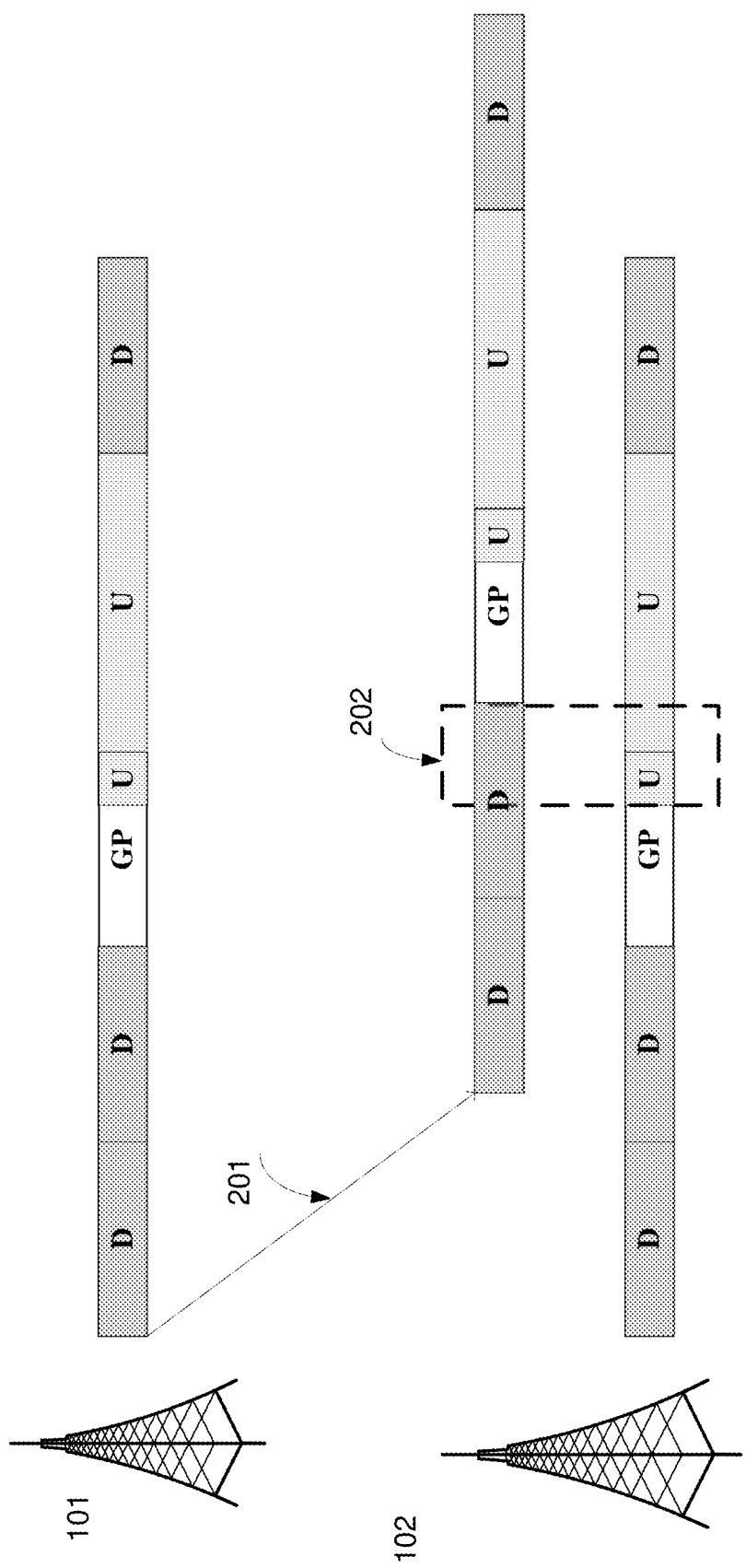
FIG. 2 shows an example of interfered uplink frames caused by the atmospheric ducting phenomenon depicted in FIG. 1.

However, when the atmospheric ducting phenomenon happens, radio signals can travel a relatively long distance, and the propagation delay goes beyond the gap. In this case, the downlink signals of a first base station can travel a long distance and interfere with the uplink signals of a second base station that is far away, causing interference known as remote interference. FIG. 1 shows an example of a remote interference caused by an atmospheric ducting phenomenon. In FIG. 1, the downlink signals from gNB 1 (101) can travel across the ground or sea and interfere with the uplink signals of gNB 3 (103). FIG. 2 shows an example of interfered uplink frames caused by the atmospheric ducting phenomenon depicted in FIG. 1. As shown in FIG. 2, downlink transmissions from gNB 1 (101) can arrive at gNB 3 (103) after a long transmission delay (201). As indicated by the overlapping area 202, some of the downlink symbols transmitted by gNB1 (101) now interfere with the uplink symbols transmitted by the gNB3 (102).

In some embodiments, for the remote interference management, co-channel interference between gNBs with semi-static TDD configuration is considered. It is assumed that within the whole network, the semi-configured DL and UL between gNBs does not conflict with each other. To guarantee this assumption, the whole network establishes a common understanding on the maximum DL transmission boundary and the maximum UL transmission boundary within a DL-UL switching period.

Figure 3:
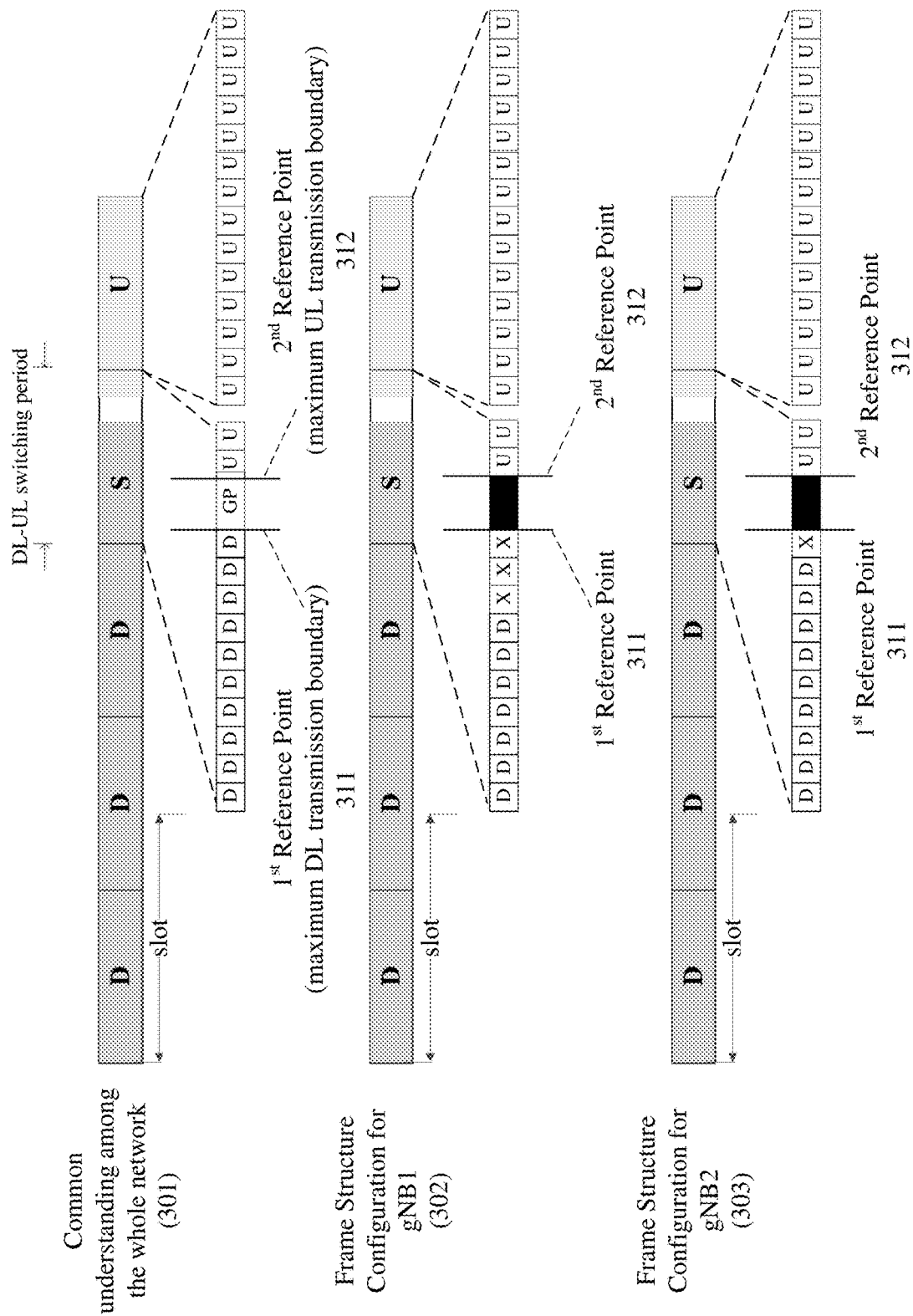
FIG. 3 shows an example of different frame structures used by different base stations with respect to the common understanding of the maximum downlink transmission boundary and the maximum uplink transmission boundary.

FIG. 3 shows an example of different frame structures used by different base stations with respect to the common understanding of the maximum downlink transmission boundary and the maximum uplink transmission boundary. As shown in FIG. 3, the network establishes a common understanding (301) of the maximum downlink transmission boundary 311 (also referred to as the first reference point) and the maximum uplink transmission boundary 312 (also referred to as the second reference point). The two base stations, gNB 1 and gBN 2, have different frame structures (302, 303). For example, the frame structure used by gNB 1 (301) includes five flexible symbols (denoted as "F" or "X") between the downlink and uplink symbols. The frame structure used by gNB 2 (303), on the other hand, includes three flexible symbols between the downlink and uplink symbols. However, both base stations honor the first reference point (311) and second references point (312) to ensure that there is no downlink symbol scheduled after the maximum downlink transmission boundary and there is no uplink symbol scheduled prior to the maximum uplink transmission boundary in a DL-UL switch periodicity (e.g., DL-UL transmission periodicity). The configuration rule ensures that the semi-statically configured DL and UL between gNBs do not collide with each other in the absence of an atmospheric waveguide.

Furthermore, to manage remote interferences as described above, several frameworks have been proposed, which include the following:

Framework-1

Figure 4A:
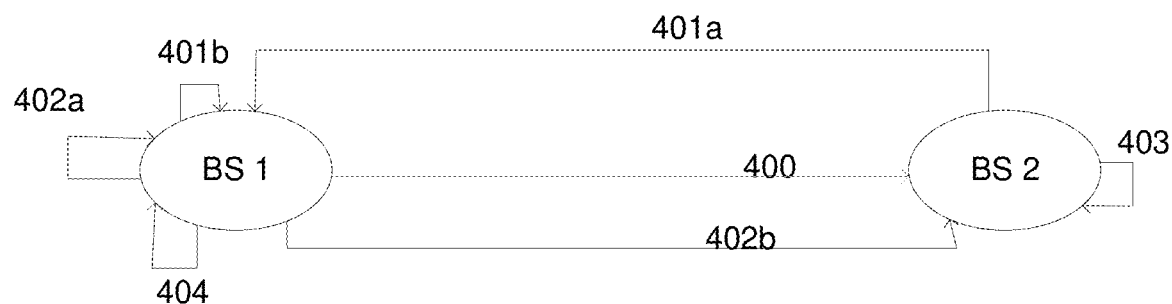
FIG. 4A is a flow chart representation of Framework-1 for the remote interference management.

FIG. 4A is a flow chart representation of Framework-1 for the remote interference management.

Step 400: Atmospheric ducting phenomenon happens and the remote interference appears.

Step 401:

The interfered base station experiences remote interference and starts reference signal (RS) transmissions (401a).

This RS marked as RS-1 is used to assist the interfering base station to recognize that it is causing remote interference to the interfered base station and to detect and deduce how many uplink (UL) resources of the interfered base station are impacted by the interference.

The interfering base station starts monitoring the RS-1 (401b).

Step 402: Upon reception of RS-1, the interfering base station starts remote interference mitigation solutions (402a) such as muting some downlink (DL) transmission symbols and transmits a reference signal (402b) to inform the interfered base station that the atmospheric ducting phenomenon still exist.

This reference signal marked as RS-2 is used to assist the interfered base station to decide whether the atmospheric ducting phenomenon still exist.

Step 403: The interfered base station continues RS-1 transmissions while receiving RS-2. Upon the disappearance of RS-2, the interfered base station stops RS-1 transmission.

Step 404: The interfering base station continues remote interference mitigation while receiving RS-1. Upon disappearance of RS-1, the interfering base station restores original configuration.

Here, RS-1 and RS-2 can be the same type of reference signal, or different types of reference signals.

Framework-2.1

Figure 4B:
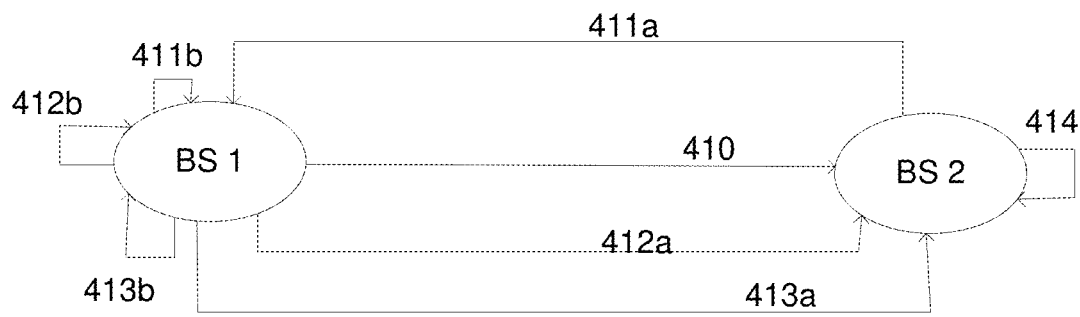
FIG. 4B is a flow chart representation of Framework-2.1 for the remote interference management.

FIG. 4B is a flow chart representation of Framework-2.1 for the remote interference management.

Step 410: Atmospheric ducting phenomenon happens and the remote interference appears.

Step 411:

The interfered base station experiences remote interference and start reference signal (RS) transmissions (411a).

The interfering base station starts monitoring RS (411b).

Step 412: Upon reception of RS, the interfering base station informs the interfered base station the reception of RS through backhaul (412a) and apply interference mitigation scheme (412b).

Step 413: Upon disappearance of RS, the interfering base station informs the interfered base station the disappearance of RS through backhaul (413a) and restore the original configuration (413b).

Step 414: The interfered base station stops RS transmission upon the reception of the disappearance of RS info through backhaul.

Framework-2.2

Figure 4C:
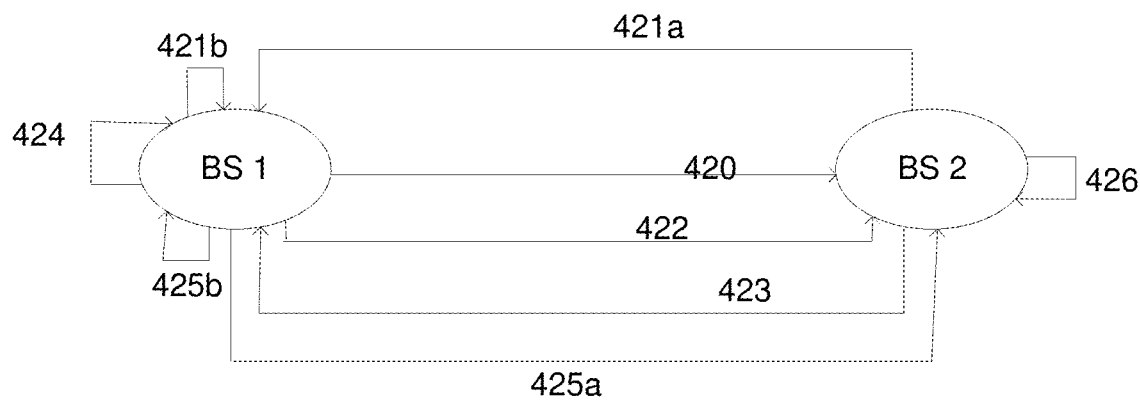
FIG. 4C is a flow chart representation of Framework-2.2 for the remote interference management.

FIG. 4C is a flow chart representation of Framework-2.2 for the remote interference management.

Step 420: Atmospheric ducting phenomenon happens and the remote interference appears.

Step 421:

The interfered base station experiences remote interference and starts reference signal (RS) transmissions (421a).

The interfering base station starts monitoring RS (421b).

Step 422: Upon reception of RS, the interfering base station informs the interfered base station the reception of RS through backhaul.

Step 423: Upon reception of the "reception of RS" info received in the backhaul, the interfered base station informs the interfering base station to apply interference mitigation scheme.

Step 424: The interfered base station applies the remote interference mitigation scheme.

Step 425: Upon "disappearance" of RS, the interfering base station informs the interfered base station the "disappearance" of RS through backhaul (425a). The interfering base station also restores the original configurations and stops transmitting the RS (425b).

Step 426: The interfered base station stops RS transmission upon the reception of the "disappearance of RS" info through backhaul.

This patent document describes various techniques that can be used to transmit the remote interferent management-reference signal (RIM-RS). This patent document also describes other techniques that can be used by the interfering base station to accurately deduce how many uplink (UL) resources of the interfered base station are impacted by the remote interference. These techniques can be used by the remote interference management process to effectively execute remote interference mitigation schemes, thereby reducing the impact of the remote interferences without affecting system performance.

Some examples of the disclosed techniques are described in the following example embodiments.

Embodiment 1

In general, as described in the frameworks above, the remote interference management (RIM) process includes the following steps:

The interfered base station or the interfered base station set confirms that it is subject to atmospheric duct interference. The interfered base station or base station set then transmits the RIM-RS.

The interfering base station or the interfering base station set detects the RIM-RS. When the RIM-RS is detected, the interfering base station or base station set is aware that it is interfering with others. The interfering base station or base station set then performs subsequent operations, such as a RI mitigation scheme.

Alternatively, the interfering base station or the base station set can transmit the RIM-RS-2, upon knowing that there is remote interference. The RIM-RS-2 is then detected by the interfered base station or base station set to determine if the atmospheric duct phenomenon persists.

However, how the RIM-RS is transmitted is not clearly defined yet. This embodiment describes several ways of scheduling the RIM-RS so that either the interfering base station or the interfered base station can detect the remote interference via the RIM-RS.

Method 1: A first base station confirms that it is subject to RI between the first base station and a second base station. The first base station schedules (or transmits) the RIM-RS on the last or last few DL symbols before the maximum DL transmission boundary (i.e., the first reference point).

Method 2: The first base station confirms that it is subject to RI between the first base station and a second base station. The first base station schedules the RIM-RS on the last symbol or last few symbols before the first reference point. In some embodiments, the first base station schedules the RIM to multiple symbols that are consecutive in the time domain. The symbol(s) can be DL symbol(s), Flexible symbol(s), or a GP symbol(s).

Method 3: The first base station confirms that it is subject to RI between the first base station and a second base station. The first base station schedules multiple RIM-RSs on multiple symbols prior to the first reference point. The symbols may be DL symbols, flexible symbols, or GP symbols. The multiple RIM-RSs may be scheduled as consecutive or discontinuous in the time domain. For example, a subset of RIM-RSs can be continuous in the time domain, while the remaining RIM-RSs are discontinuous. In some embodiments, the multiple symbols at least include the last symbol before the first reference point.

Figure 11:
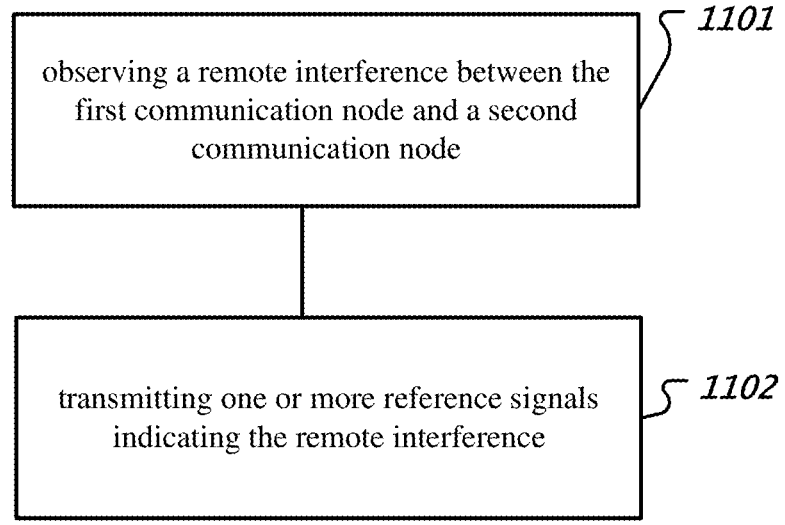
FIG. 11 is a flowchart representation of a method for wireless communication in accordance with one or more embodiments of the present technology.

FIG. 11 is a flowchart represent of a method 1100 for wireless communication. The method 1100 includes, at step 1101, observing, by a first communication node, a remote interference between the first communication node and a second communication node. The first communication node and the second communication node agree on a maximum downlink transmission boundary and a maximum uplink transmission boundary within a downlink-uplink switching period. The method 1101 also includes, at step 1102, transmitting, by the first communication node, one or more reference signals indicating the remote interference. The one or more reference signals occupy one or more time-domain symbols before the maximum downlink transmission boundary, the one or more time-domain symbols including a downlink symbol, a flexible symbol, or a guard period symbol.

Embodiment 2

Successful transmission of the RIM-RS, however, does not guarantee that the base station that receives the RIM-RS can accurately deduce which uplink symbols are affected by the remote interference. This embodiment describes techniques that can be used by the receiver of the RIM-RS to accurately determine whether any symbols have been affected by the remote interference, and if yes, which ones are affected.

Assuming that the first base station transmits the RIM-RS on the last DL symbol using the first method in Embodiment 1, several scenarios are examined to demonstrate some of the problems in the current frameworks.

Figure 5A:
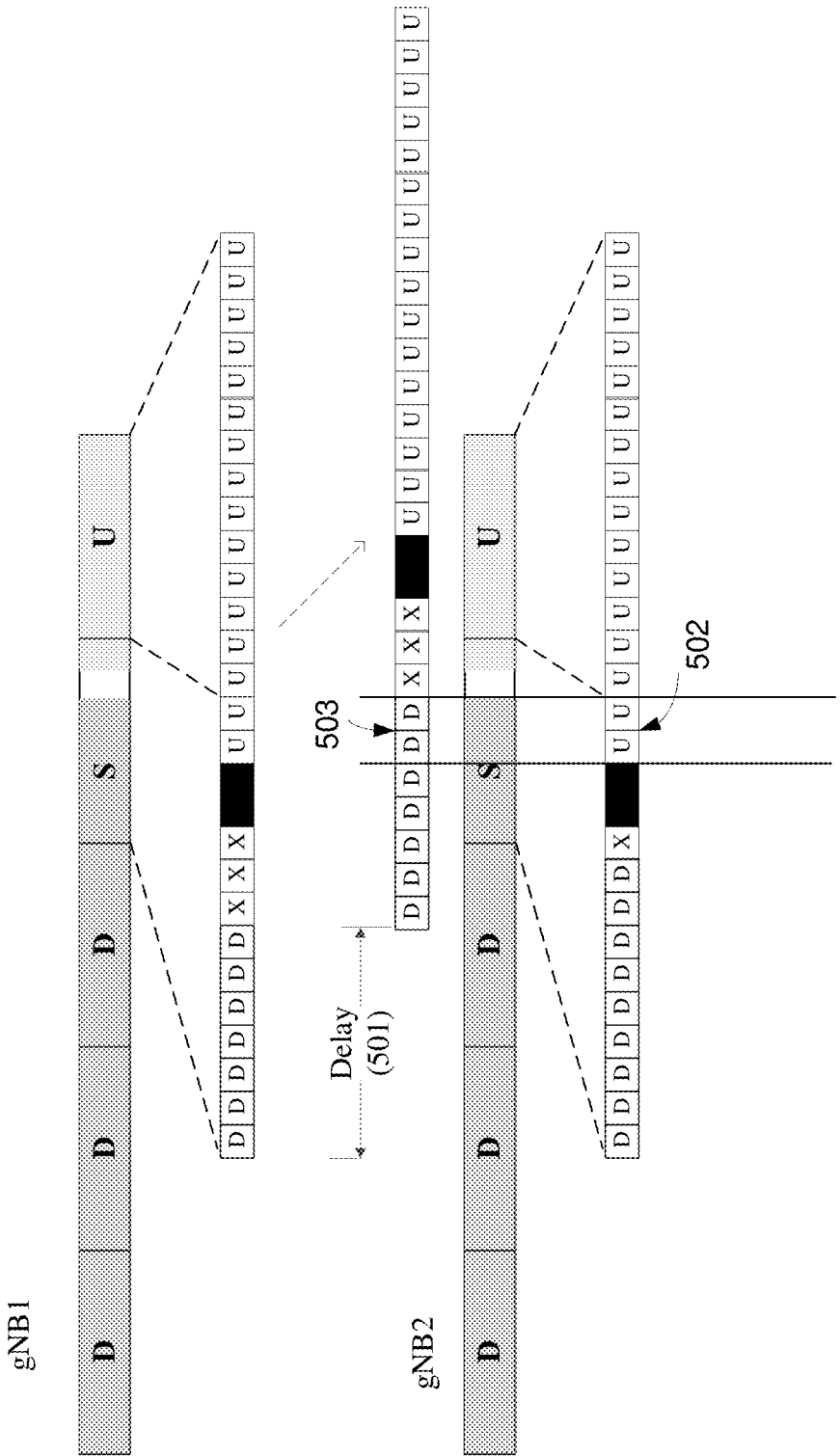
FIG. 5A shows an example of a remote interference between two base stations.

Case 1: Assume that gNB1 is an interfering base station and gNB2 is an interfered base station. Also assume that the subcarrier spacings are the same. FIG. 5A shows an example of a remote interference between the two base stations in this case. If the transmission delay (501) between gNB1 and gNB2 is 7 symbols, then two UL symbols of gNB2 (502) are interfered by the two DL symbols of gNB1 (503) after transmission through the atmospheric duct.

Figure 5B:
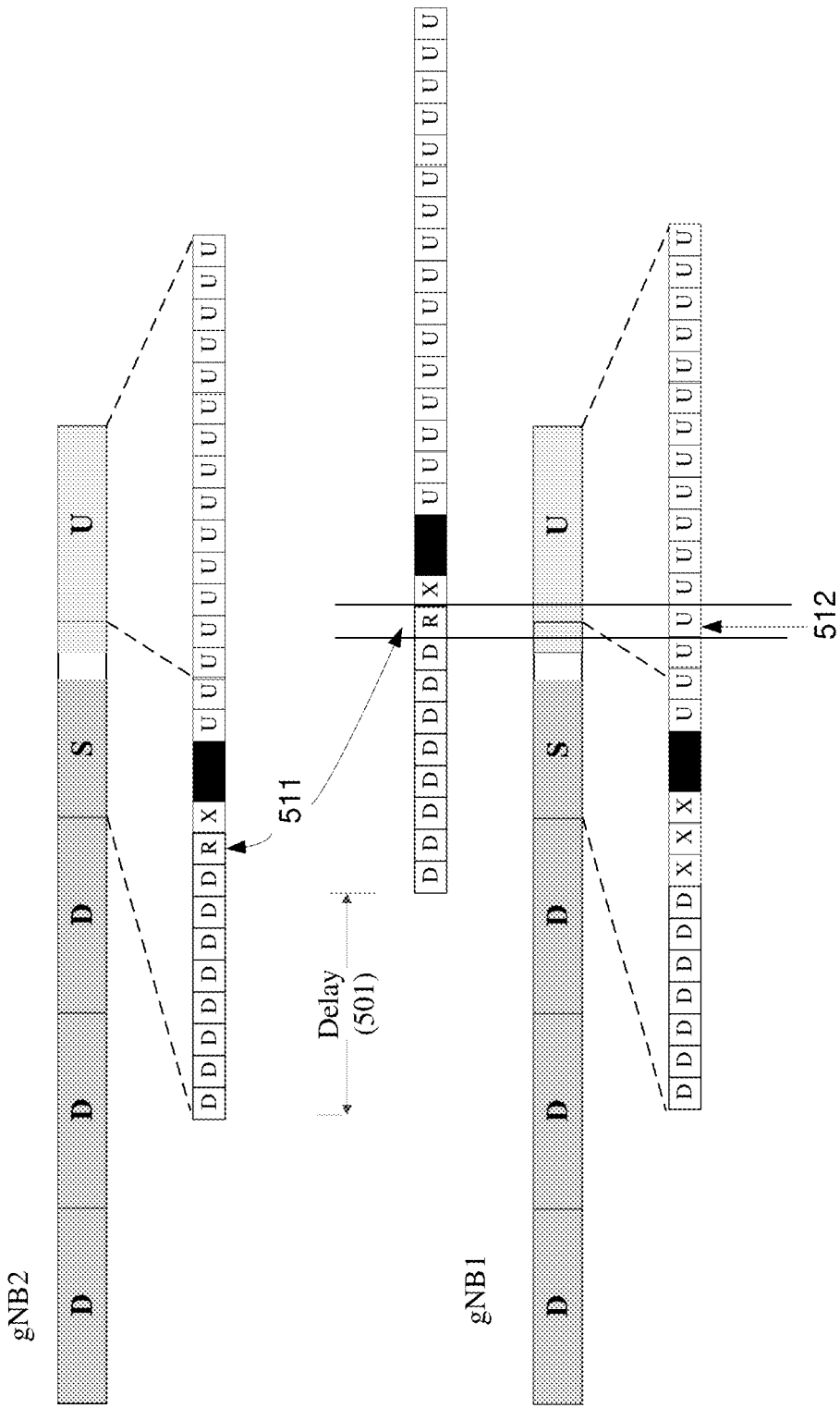
FIG. 5B shows an example of inaccurate detection of the interfered uplink symbols in the case depicted in FIG. 5A.

As shown in FIG. 5B, gNB2 detects the interference and transmits the RIM-RS (511) on the last DL symbol. gNB1 now receives the RIM-RS at the 4th UL symbol (512) after the delay (501). Then gNB1 may deem that it is interfering four UL symbols of gNB2, and performs a corresponding remote interference mitigation scheme for four symbols (e.g., muting four DL symbols). However, only two UL symbols are interfered. Such mitigation scheme overcompensates and can reduce the performance of gNG1's downlink transmissions.

Case 2: Assume that gNB2 is an interfering base station and gNB1 is an interfered base station. Also assume that the subcarrier spacings are the same.

Figure 6A:
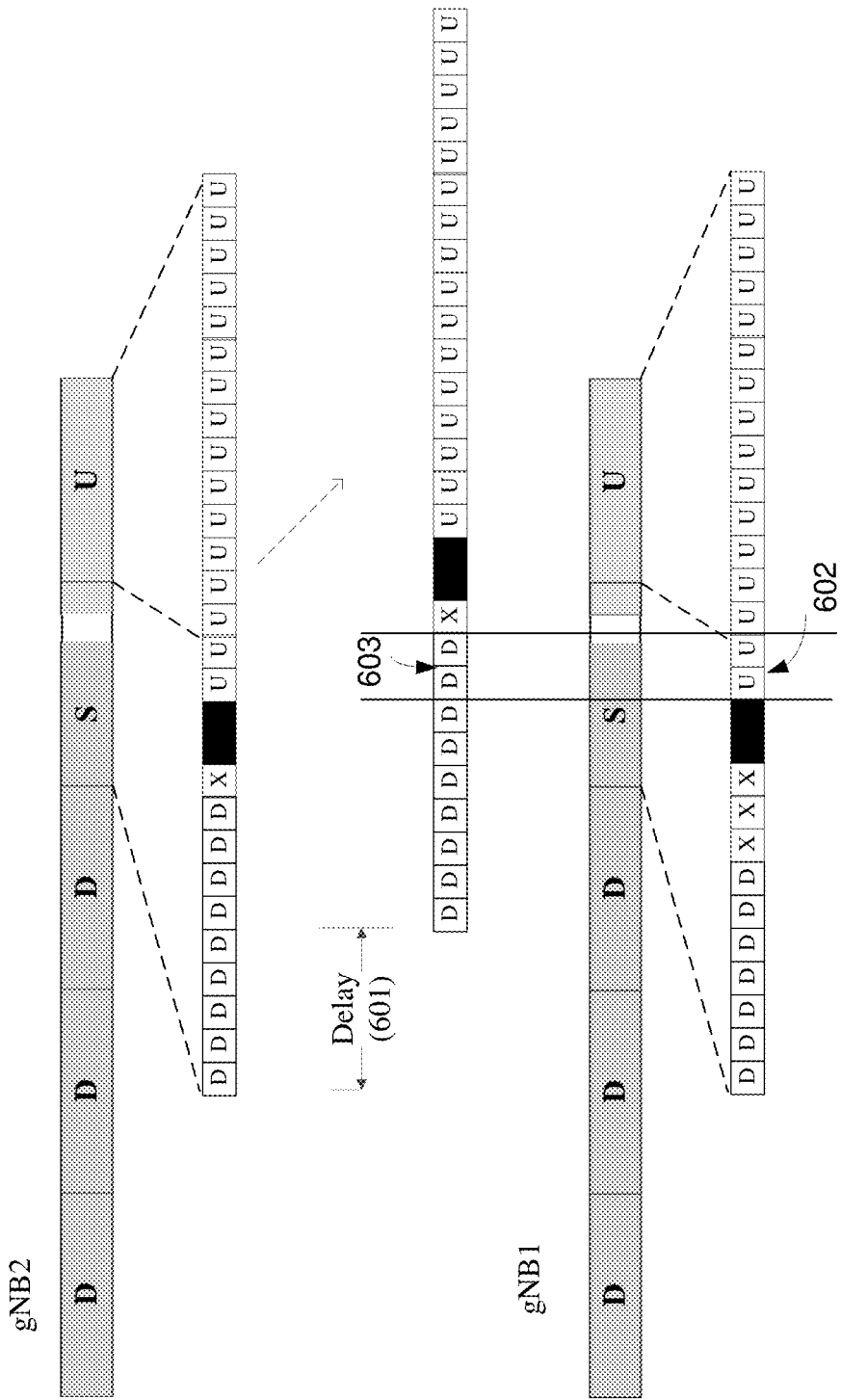
FIG. 6A shows another example of a remote interference between two base stations.

Case 2-1: FIG. 6A shows an example of a remote interference between the two base stations in this case. If the transmission delay (601) between gNB1 and gNB2 is 5 symbols, two UL symbols of gNB1 (602) are interfered by the two DL symbols of gNB2 (603) after transmission through the atmospheric duct.

Figure 6B:
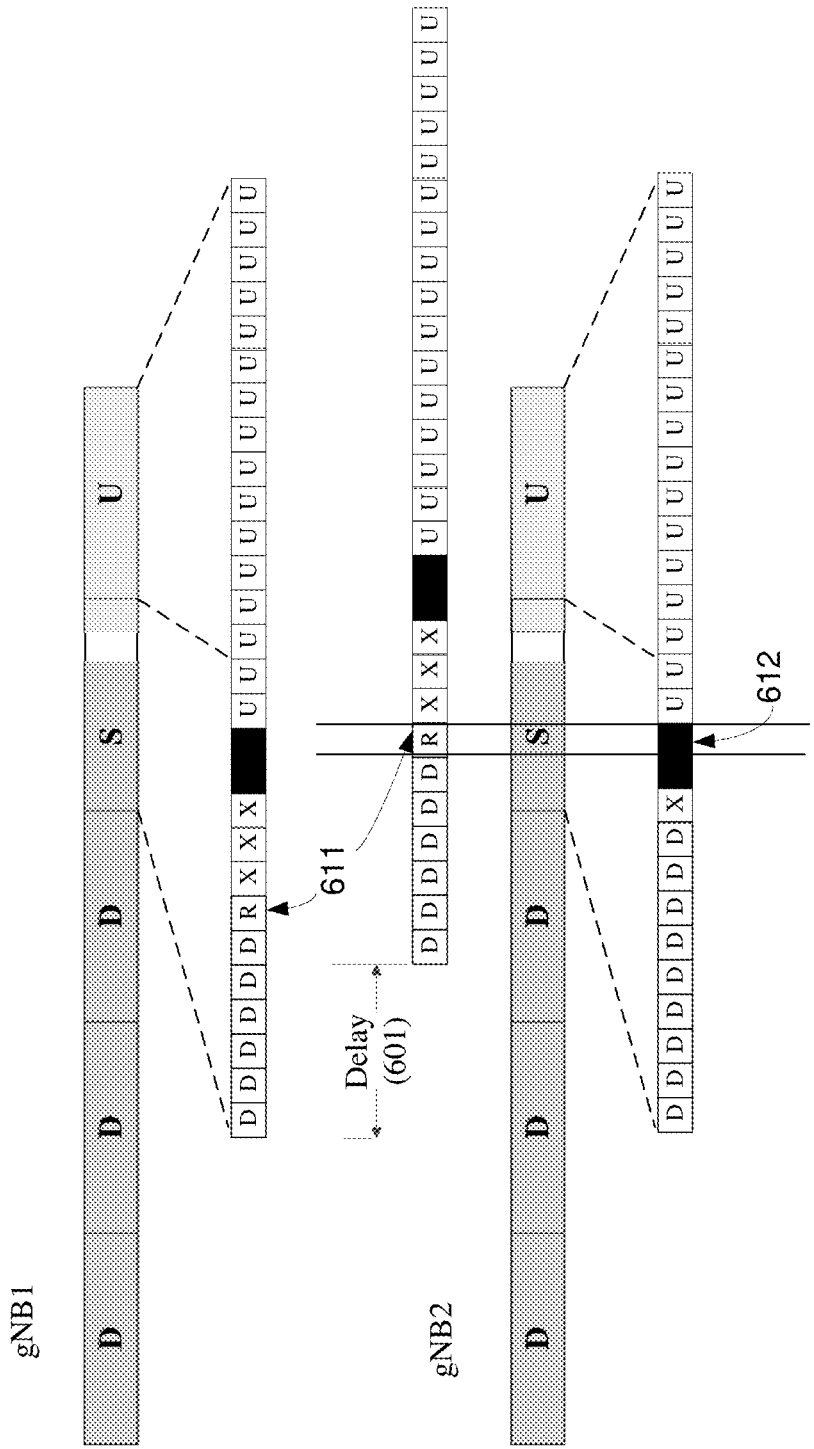
FIG. 6B shows an example of inaccurate detection of the interfered uplink symbols in the case depicted in FIG. 6A.

As shown in FIG. 6B, gNB1 detects the interference and transmits the RIM-RS (611) on the last DL symbol. gNB2 now receives the RIM-RS at a flexible symbol (612) after the delay (601). That is, gNB2 cannot detect the RIM-RS on any of the UL symbols. Thus, gNB2 will not perform any remote interference mitigation scheme, while the remote interference still exists.

Figure 7A:
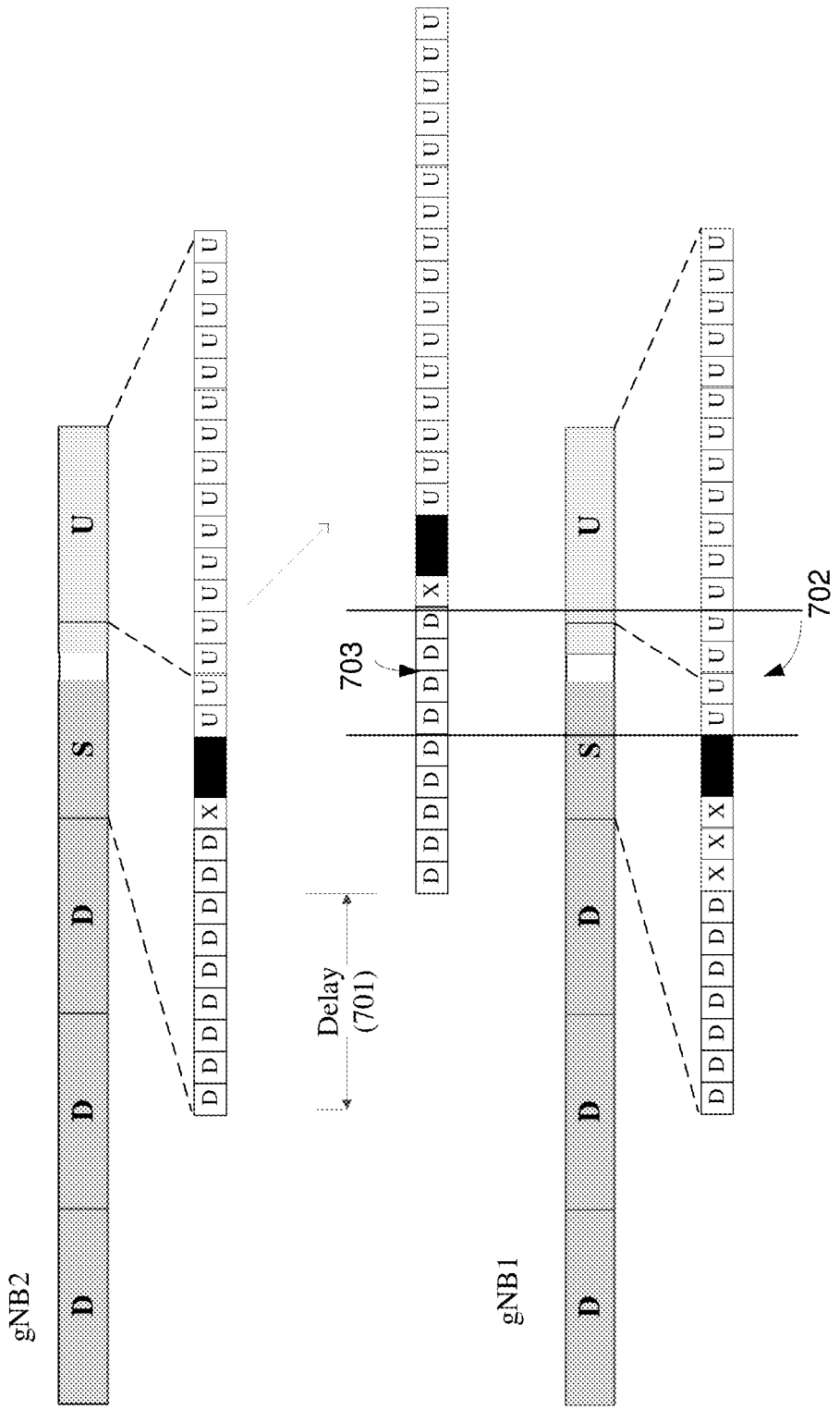
FIG. 7A shows another example of a remote interface between two base stations.

Case 2-2: FIG. 7A shows an example of a remote interface between the two base stations in this case. If the transmission delay (701) between gNB1 and gNB2 is 7 symbols, four UL symbols of gNB1 (702) are interfered by the four DL symbols of gNB2 (703) after transmission through the atmospheric duct.

Figure 7B:
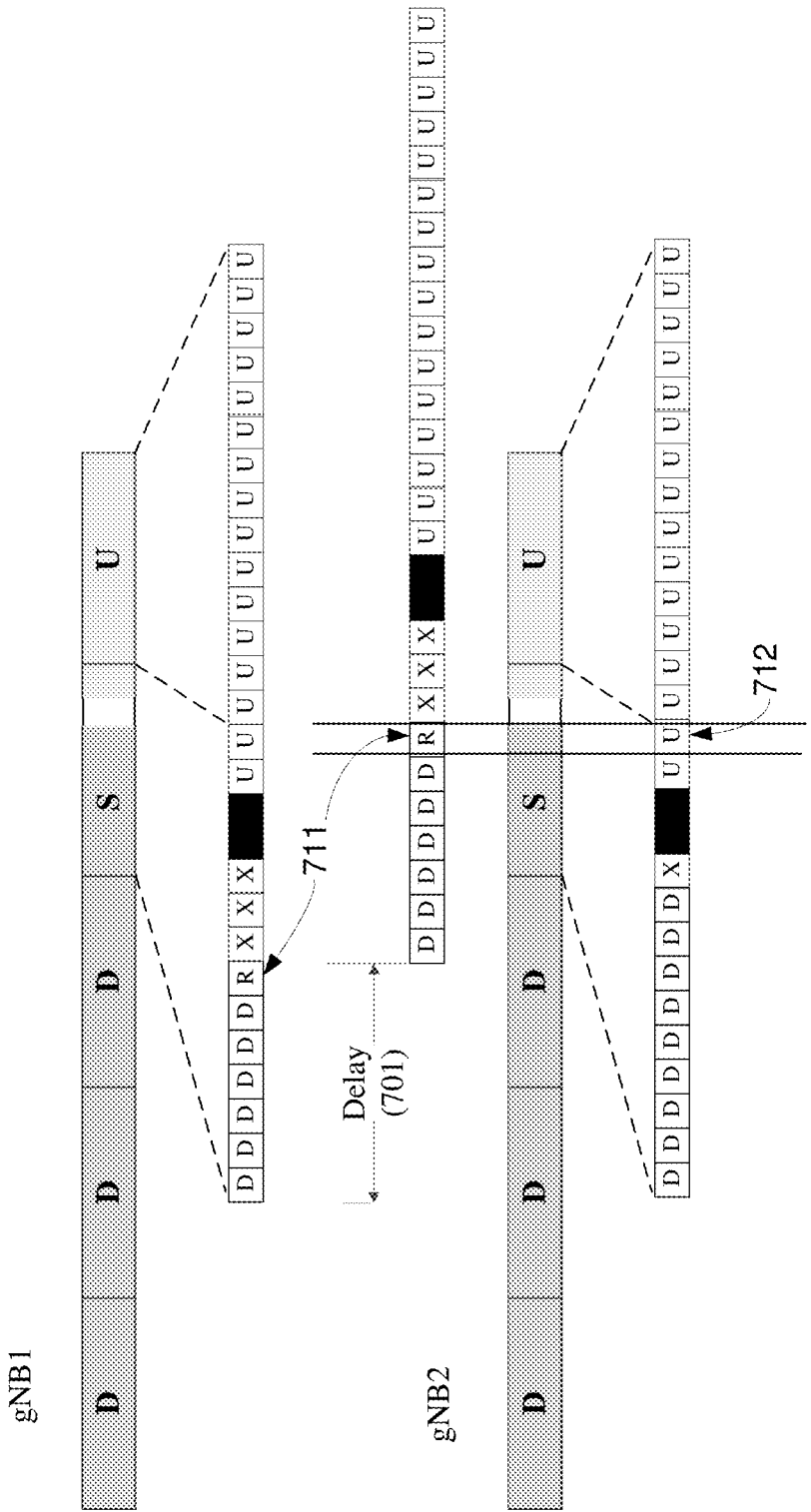
FIG. 7B shows an example of inaccurate detection of the interfered uplink symbols in the case depicted in FIG. 7A.

As shown in FIG. 7B, gNB1 detects the interference and transmits the RIM-RS (711) on the last DL symbol. gNB2 now receives the RIM-RS at the second UL symbol (712) after the delay (701). Then gNB2 may deem that it is interfering two UL symbols of gNB1, and performs a corresponding remote interference mitigation scheme for two symbols (e.g., muting two DL symbols). However, four UL symbols are interfered. Such mitigation scheme undercompensates and cannot eliminate the remote interference.

Figure 8A:
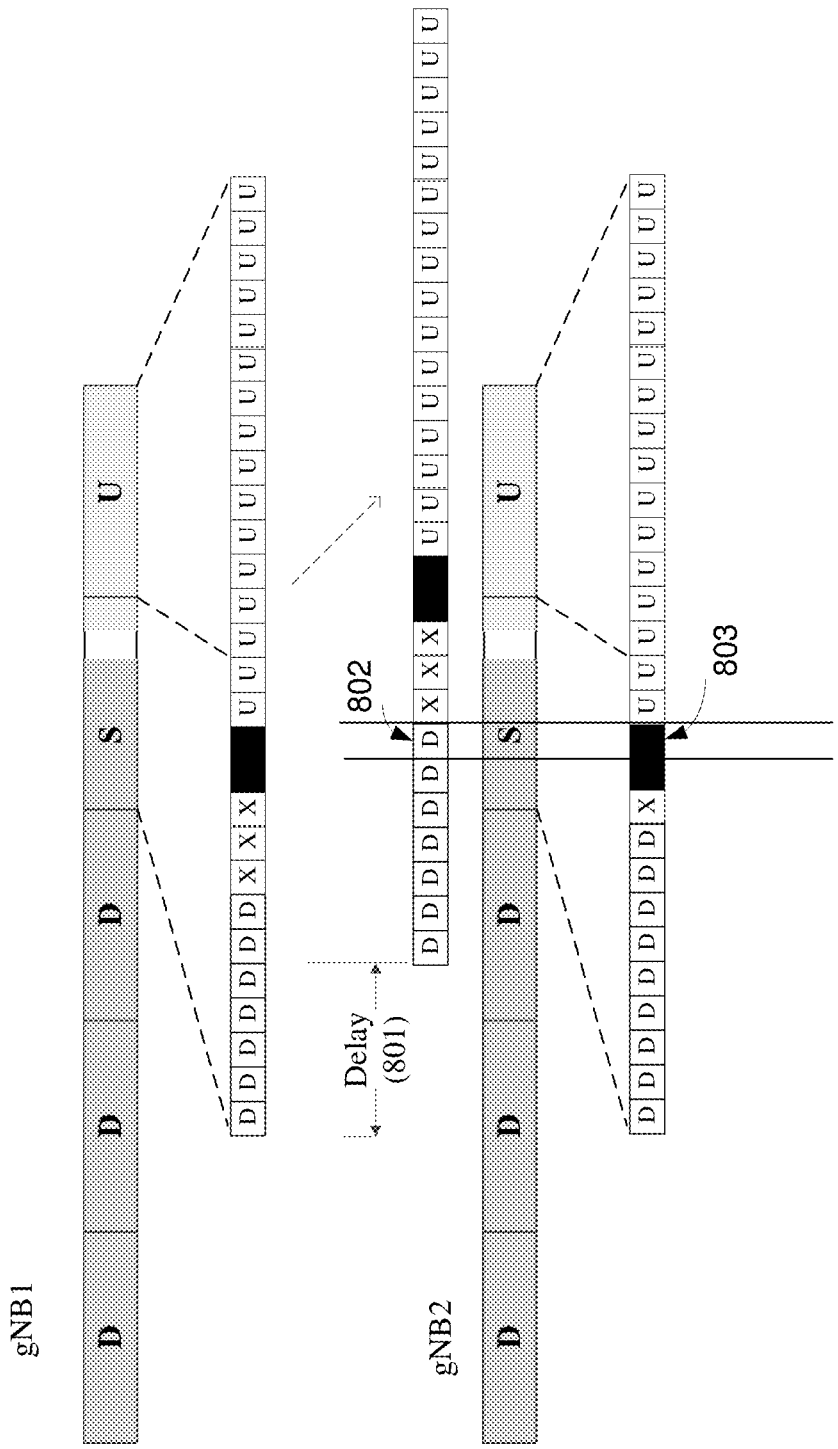
FIG. 8A shows an example of two base stations not interfering with each other.

Case 3: Assume that gNB2 is an interfered base station. However, gNB1 is not the base station that interferes gNB2. Also assume that the subcarrier spacings are the same. FIG. 8A shows an example of this scenario. If the transmission delay (801) between gNB1 and gNB2 is 5 symbols, the last DL symbol from gNB1 (802) overlaps with the last GP symbol or X symbol of gNB2 (803). Therefore, there is no remote interference.

Figure 8B:
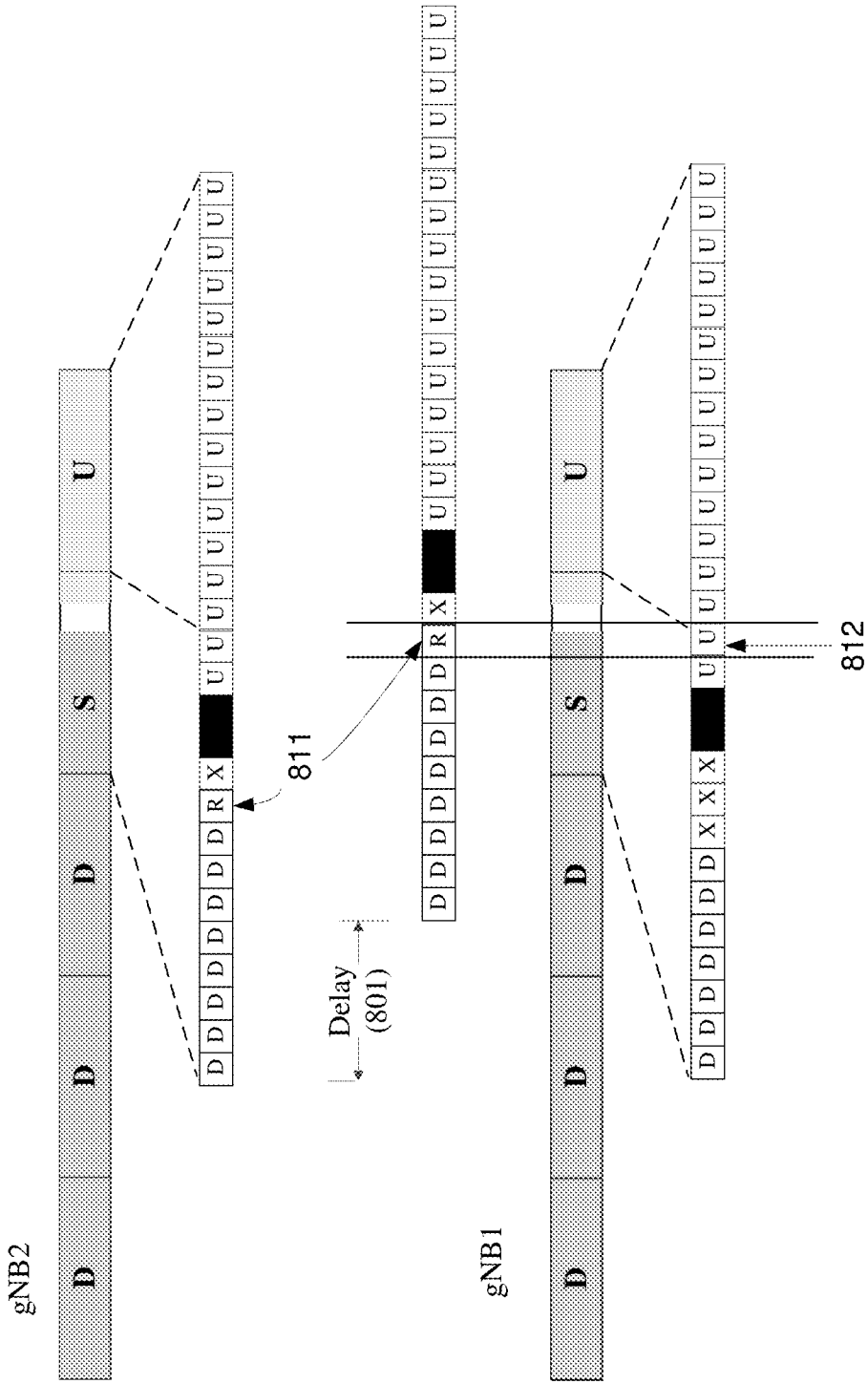
FIG. 8B shows an example of inaccurate detection of the interfered uplink symbols in the case depicted in FIG. 8A.

However, supposed that gNB2 is interfered by gNB3 instead. As shown in FIG. 8B, gNB2 detects the interference (caused by gNB3) and transmits the RIM-RS (811) on the last DL symbol. gNB1 now receives the RIM-RS at the second UL symbol (812) after the delay (801). Then gNB1 may deem that it is interfering two UL symbols of gNB2, and performs a corresponding Remote interference mitigation scheme for two symbols (e.g., muting two DL symbols). Such mitigation scheme overcompensates and can reduce the performance of gNG1's downlink transmissions unnecessarily.

The above cases demonstrate that, without additional information from the interfered base station, the existing frameworks have the following problems:

Problem 1: gNB1 does not interfere with gNB2, but gNB2 is interfered by another base station. Due to the different slot formats, gNB1 receives the RIM-RS from gNB2 on its UL symbols. gNB1 then performs a Remote interference mitigation scheme when it is not necessary.

Problem 2: gNB1 interferes with gNB2 on N number of UL symbols. However, due to the different slot formats, gNB1 receives the RIM-RS from gNB2 on the N+M (M>0) UL symbols. gNB1 then performs a Remote interference mitigation scheme to mute N+M symbols, while muting N symbols would have been sufficient.

Problem 3: gNB1 interferes with gNB2 on N number of UL symbols. However, due to the different slot formats, gNB1 cannot receive any RIM-RS on its UL symbols. gNB1 fails to perform an Remote interference mitigation scheme when it is necessary.

Problem 4: gNB1 interferes with gNB2 on N number of UL symbols. However, due to the different slot formats, gNB1 receives the RIM-RS from gNB2 on the N−M (0<M<N) UL symbols. gNB1 then performs a Remote interference mitigation scheme to mute N−M symbols, while muting N symbols is necessary.

Several solutions will be described below to resolve these problems.

Solution 1:

The first base station transmits at least one of the following information regarding the slot format to other base stations: the number of flexible symbols, the number of DL symbols, the number of UL symbols, the number of symbols between the last DL symbols and the RIM-RS symbol or the first reference point, the number of symbols between the first UL symbol and the RIM-RS symbol or the second reference point, the number of symbols between the RIM-RS symbol and the first reference point, and/or the subcarrier spacing.

In some embodiments, the foregoing configuration information may be carried by the scrambling code information, the sequence information, or the transmitted timing information of the RIM-RS. The timing information may be a period, offset, subframe information/slot information/symbol information in a time unit, and the like of transmission of the RIM-RS.

In some embodiments, the foregoing configuration information can be transmitted to other base stations through the backhaul signaling. The other base stations may be a base station or a set of base stations to receive the RIM-RS, or a designated base station or set of base stations. The number of symbols in the above parameters may also be represented by other time units, such as a subframe, or a time slot, or a millisecond, or a microsecond.

Several examples are provided below to further explain the relevant techniques:

Example 1-1

Figure 9A:
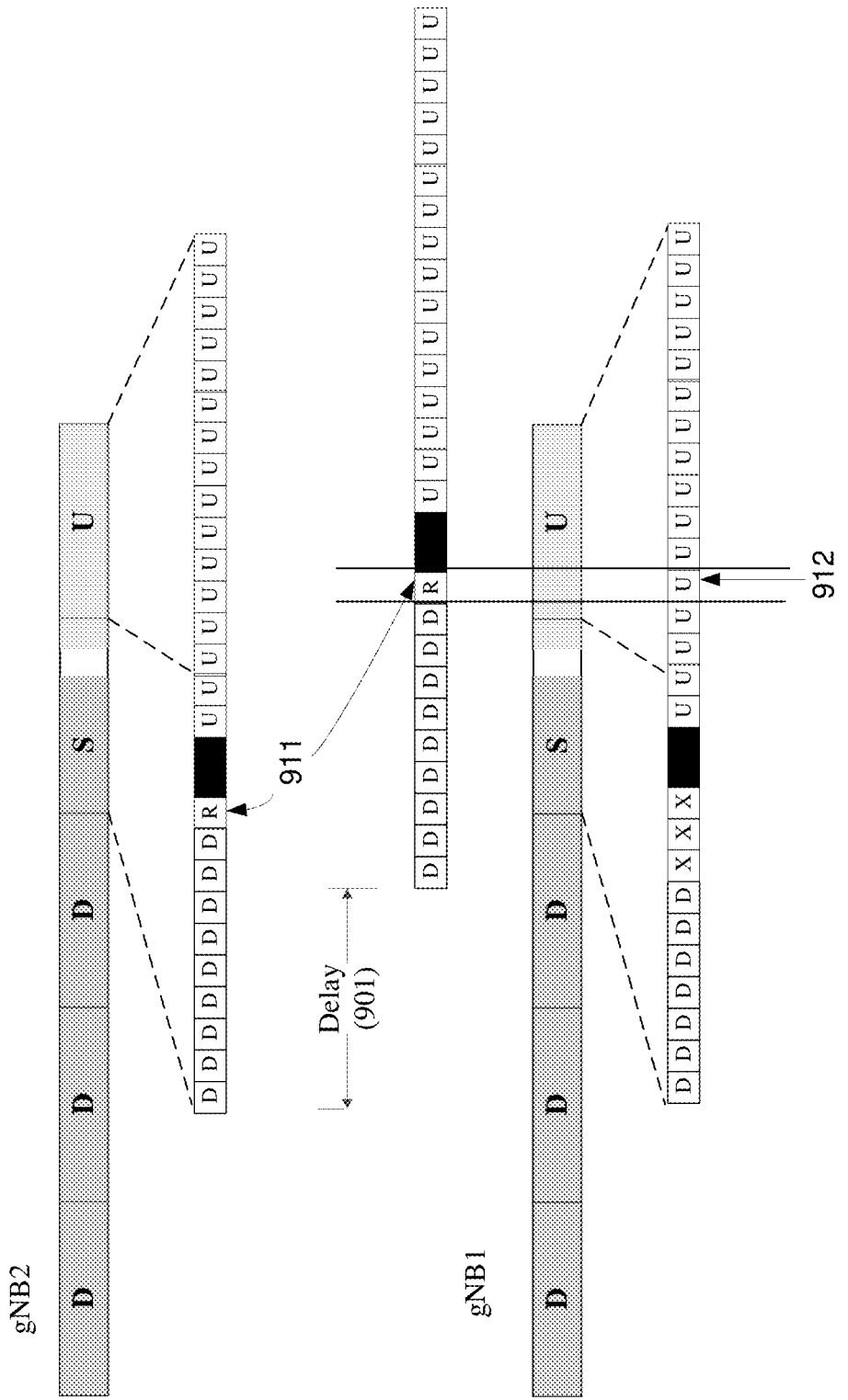
FIG. 9A shows an example of detecting a remote interference for the case depicted in FIG. 5A in accordance with one or more embodiments of the present technology.

FIG. 9A shows an example of detecting a remote interference for Case 1 depicted in FIG. 5A in accordance with one or more embodiments of the present technology. In FIG. 9A, gNB2 detects the interference and transmits the RIM-RS on the last symbol (911) before the first reference point. The gNB1 now receives the RIM-RS at the 5th UL symbol (912) after the delay (901) of 7 symbols. Meanwhile, gNB2 informs gNB1 the number of symbols M2 between the first UL symbol scheduled by gNB2 and the second reference point (in this case, $m_2=0$).

The gNB1 knows about the number of symbols between the first reference point and the second reference point $n_1$ (in this case, $n_1=2$). The gNB1 also knows the number of symbols between its first UL symbol and the second reference point $n_2$ (in this case, $n_2=0$). The gNB1 detects that it receives the RIM-RS on the $S_{th}$ UL symbols (in this case, S=5). It now can compute n_delay=$n_1+n_2+S$=7 symbols. If the RIM-RS is detected in multiple symbols, S is determined to be equal to the index of the last UL symbol among these symbols (e.g., sequence number of last interfered UL symbol in a DL-UL transmission periodicity).

The gNB1 then calculates the number of interfered UL symbols based on n_delay, the number flexible or GP symbols n_x, and $m_2$. In some implementations, n_x can be determined based on the number of symbols between the first reference point and the last DL symbols $n_0$, the number of symbols between the first reference point and the second reference point $n_1$, and the number of symbols between the first UL symbol and the second reference point $n_2$: n_x=$n_0+n_1+n_2$ (in this case, n_x=5). The n_interfered can be determined as: n_interfered=n_delay−n_x−$m_2$=7−5−0=2. This result is consistent with the situation depicted in FIG. 5A.

Example 1-2

Figure 9B:
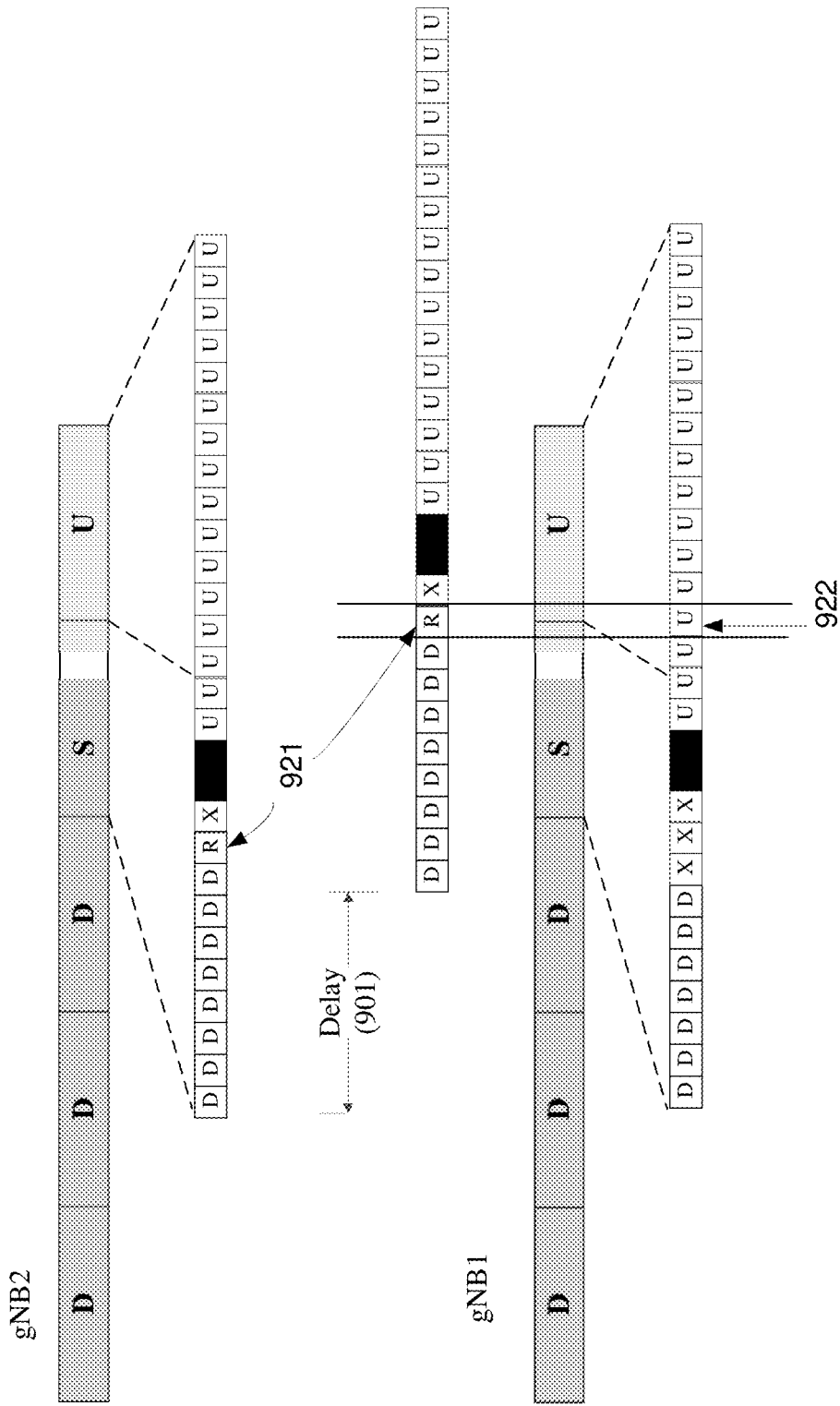
FIG. 9B shows another example of detecting a remote interference for the case depicted in FIG. 5A in accordance with one or more embodiments of the present technology.

FIG. 9B shows another example of detecting a remote interference for Case 1 depicted in FIG. 5A in accordance with one or more embodiments of the present technology. In FIG. 9B, gNB2 detects the interference and transmits the RIM-RS on the last DL symbol (921) before the first reference point. The gNB1 now receives the RIM-RS at the 4th UL symbol (922) after the delay (901) of 7 symbols. Meanwhile, gNB2 informs gNB1 the number of symbols between the last DL symbol scheduled by gNB2 and the first reference point $m_0$ (in this case, $m_0=1$) and the number of symbols between the first UL symbol scheduled by gNB2 and the second reference point $m_2$ (in this case, $m_2=0$).

The gNB1 knows about the number of symbols between the first reference point and the second reference point $n_1$ (in this case, $n_1=2$). The gNB1 also knows the number of symbols between its first UL symbol and the second reference point $n_2$ (in this case, $n_2=0$). The gNB1 detects that it receives the RIM-RS on the $S_{th}$ UL symbols (in this case, S=4). It now can compute n_delay=$n_1+n_2+S+m_0$=7 symbols.

The gNB1 then calculates the number of interfered UL symbols based on n_delay, the number flexible or GP symbols n_x, and $m_2$: n_interfered=n_delay−n_x−$m_2$=7−5=0=2. This result is consistent with the situation depicted in FIG. 5A.

Example 2-1

Figure 10A:
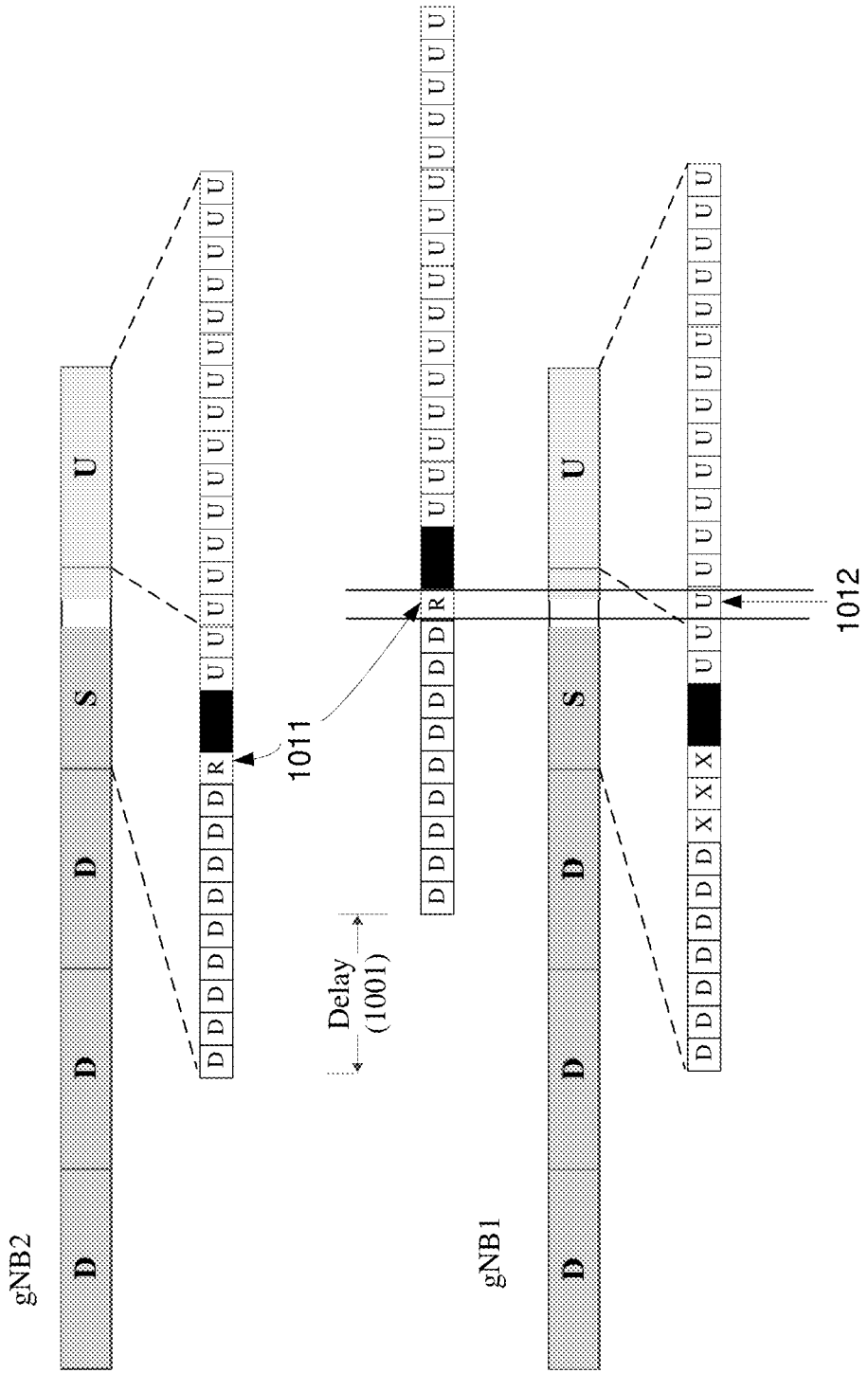
FIG. 10A shows an example of detecting a remote interference for Case 2 depicted in FIG. 6A in accordance with one or more embodiments of the present technology.

FIG. 10A shows an example of detecting a remote interference for Case 2 depicted in FIG. 6A in accordance with one or more embodiments of the present technology. In FIG. 10A, gNB2 detects the interference (with was caused by a base station other than gNB1) and transmits the RIM-RS on the last symbol (1011) before the first reference point. The gNB1 now receives the RIM-RS at the third UL symbol (1012) after the delay (1001) of 5 symbols. Meanwhile, gNB2 informs gNB1 the number of symbols between the first UL symbol scheduled by gNB2 and the second reference point $m_2$ (in this case, $m_2=0$).

The gNB1 knows about the number of symbols between the first reference point and the second reference point $n_1$ (in this case, $n_1=2$). The gNB1 also knows the number of symbols between its first UL symbol and the second reference point $n_2$ (in this case, $n_2=0$). The gNB1 detects that it receives the RIM-RS on the $S_{th}$ UL symbols (in this case, S=3). It now can compute n_delay=$n_1+n_2+S$=5 symbols.

The gNB1 then calculates the number of interfered UL symbols based on n_delay, the number flexible or GP symbols n_x, and $m_2$: n_interfered=n_delay−n_x−$m_2$=5−5−0=0. Therefore, there is no real interference. This result is consistent with the situation depicted in FIG. 5A.

Example 2-2

Figure 10B:
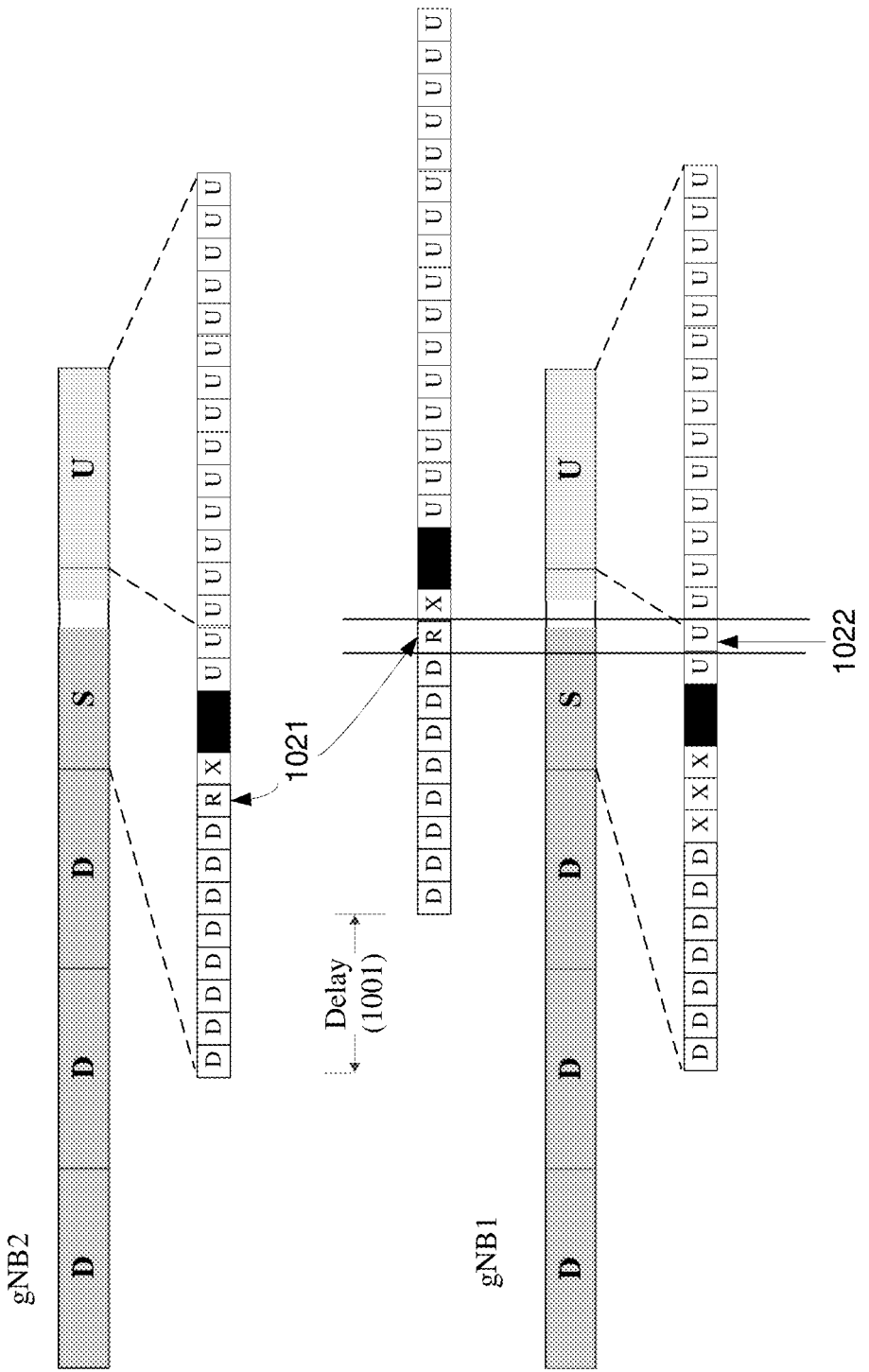
FIG. 10B shows another example of detecting a remote interference for Case 2 depicted in FIG. 6A in accordance with one or more embodiments of the present technology.

FIG. 10B shows another example of detecting a remote interference for Case 2 depicted in FIG. 6A in accordance with one or more embodiments of the present technology. In FIG. 10B, gNB2 detects the interference (with was caused by a base station other than gNB1) and transmits the RIM-RS on the last DL symbol (1021) before the first reference point. The gNB1 now receives the RIM-RS at the second UL symbol (1022) after the delay (1001) of 5 symbols. Meanwhile, gNB2 informs gNB1 the number of symbols between the last DL symbol scheduled by gNB2 and the first reference point $m_0$ (in this case, $m_0=1$) and the number of symbols between the first UL symbol scheduled by gNB2 and the second reference point $m_2$ (in this case, $m_2=0$).

The gNB1 knows about the number of symbols between the first reference point and the second reference point $n_1$ (in this case, $n_1=2$). The gNB1 also knows the number of symbols between its first UL symbol and the second reference point $n_2$ (in this case, $n_2=0$). The gNB1 detects that it receives the RIM-RS on the $S_{th}$ UL symbols (in this case, S=2). It now can compute n_delay=$n_1+n_2+S+m_0$=5 symbols.

The gNB1 then calculates the number of interfered UL symbols based on n_delay, the number flexible or GP symbols n_x, and $m_2$: n_interfered=n_delay−n_x−$m_2$=5−5−0=0. Therefore, there is no real interference. This result is consistent with the situation depicted in FIG. 5A.

As shown in the examples above, the first base station (e.g., the interfering base station) can calculate the number of uplink resources or uplink symbols interfered by the remote interference according to at least one of the following parameters:
1. The number of symbols between the first reference point and the second reference point: $n_1$.
2. The number of symbols between first UL symbol scheduled or configured by the first base station and the second reference point: $n_2$.
3. The sequence number of the UL symbol(s) on which the RIM-RS is detected: S.
4. The number of symbols between the last DL symbol scheduled by second base station (e.g., the interfered base station) and the first reference point: $m_0$.

5. The number of flexible or GP symbols scheduled by the first base station: n_x.
6. The number of symbols between the last DL symbol scheduled by the first base station and the second reference point: no.
7. The number of symbols between the first UL symbol scheduled by the second base station and the second reference point symbol: $m_2$.

Among the above parameters, the first base station needs at least one of the following parameters from the second base station: $m_0$ or $m_2$.

In some embodiments, the roles of the second base station and the first base station may be interchanged (that is, the first base station may be the interfered base station, and the second base station may be the interfering base station). For example, the second base station transmits the RIM-RS, and the first base station performs calculation of the interfered UL resource. In this case, the above parameters can be similarly used for calculations.

In addition, if n_interfered is equal to or less than 0, it indicates that the base station receiving the RIM-RS does not actually cause the remote interference to the base station transmitting the RIM-RS, and the Remote interference mitigation scheme may not be performed at this time.

Solution 2:

In some embodiments, the first base station (e.g., the interfered base station) transmits at least one of the following parameters to other base stations: the time-domain locations (e.g., the start position) or duration of the interfered UL resources or symbols, the number of interfered UL resources or symbols, the interference level on the interfered UL resource, and the number of DL symbols that the other base stations need to mute. For example, there are five interfered UL symbols. The five UL symbols may correspond to one interference level or may correspond to several interference levels. In some cases, symbol 1 and symbol 2 may form a set and have a corresponding interference level measured as A. Symbols 3, 4, and 5 form another set and have another corresponding interference level measured as B. Both level A and level B can be transmitted to other base stations.

The main difference between Solution 1 and Solution 2 is that, in Solution 1, the second base station performs calculations based on the detected RIM-RS location. In Solution 2, however, the second base station can perform calculations without monitoring or detecting RIM-RS because information can be obtained directly from the first base station.

Figure 12A:
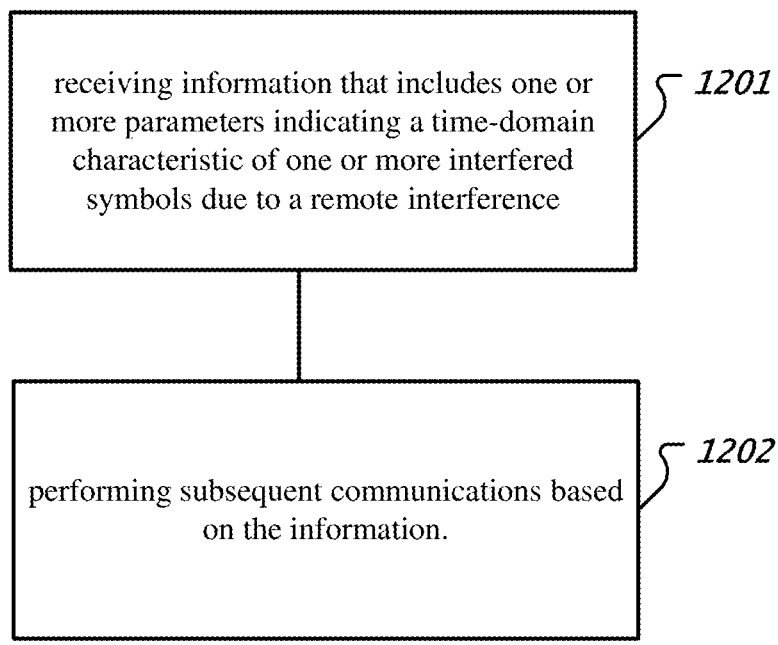
FIG. 12A is a flowchart representation of another method for wireless communication in accordance with one or more embodiments of the present technology.

FIG. 12A is a flowchart representation of a method 1200 for wireless communication. The method 1200 includes, at step 1201, receiving, at a first communication node, information that includes one or more parameters indicating a time-domain characteristic of one or more interfered symbols due to a remote interference between the first communication node and a second communication node. The method 1200 also includes, at step 1202, performing, by the first communication node, subsequent communications based on the information. In some embodiments, the first communication node and the second communication agree on a maximum downlink transmission boundary and a maximum uplink transmission boundary within a downlink-uplink switching period. The one or more parameters include a first parameter and a second parameter, the first parameter indicating a first time-domain distance between a last downlink symbol configured by the second communication node and the maximum downlink transmission boundary, and the second parameter indicating a second time-domain distance between a first uplink symbol configured by the second communication node and the maximum uplink transmission boundary.

Figure 12B:
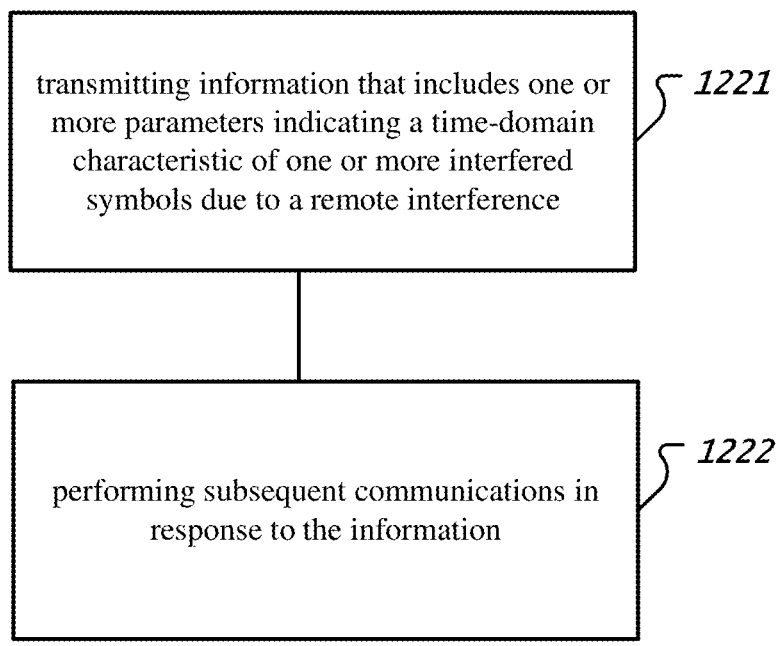
FIG. 12B is a flowchart representation of yet another method for wireless communication in accordance with one or more embodiments of the present technology.

FIG. 12B is a flowchart representation of a method 1220 for wireless communication. The method 1220 includes, at step 1221, transmitting, from the first communication node, information that includes one or more parameters indicating a time-domain characteristic of one or more interfered symbols due to a remote interference between the first communication node and a second communication node. The method 1220 also includes, at step 1222, performing, by the first communication node, subsequent communications in response to the information. In some embodiments, the first communication node and the second communication agree on a maximum downlink transmission boundary and a maximum uplink transmission boundary within a downlink-uplink switching period. The one or more parameters include a first parameter and a second parameter, the first parameter indicating a first time-domain distance between a last downlink symbol configured by the first communication node and the maximum downlink transmission boundary, and the second parameter indicating a second time-domain distance between a first uplink symbol configured by the first communication node and the maximum uplink transmission boundary. In some embodiments, the first communication node is a base station of a cell. In some embodiments, the second communication node is a base station of a neighboring cell.

Embodiment 3

The first base station (e.g., the interfered base station) confirms that it is subject to a remote interference and transmits a first reference signal (e.g., RS-1) for ascertaining the source of the remote interference. After receiving the RS-1, the second base station (e.g., the interfering base station) determines that it is interfering with the first base station. It then transmits a second reference signal (e.g., RS-2) to assist the first base station to determine whether the atmospheric ducting phenomenon still exists.

In order to reduce signal design complexity and the difficulty of detecting different reference signals, RS-1 and RS-2 can have the same signal sequence. For example, both RS-1 and RS-2 can be identified as RIM-RS. This works well for symmetric interference scenarios (e.g., the interfering base station is also an interfered base station). However, for asymmetric scenarios (e.g., the interfering base station only interferes with other base stations and is not affected by remote interferences caused by those base stations, or the remote interferences from the other base stations are small enough to be ignored), when the first base station (e.g., the interfered base station) receives the RIM-RS from the second base station (e.g., the interfering base station), the first base station may determine that it is interfering the second base station and execute unnecessary remote interference mitigation schemes. Therefore, there exists a need to differentiate the two reference signals.

In some embodiments, at least one of the following parameters can be different for the two reference signals to allow such differentiation: a scrambling sequence parameter, a generating sequence parameter, or a transmitting configuration parameter (e.g., period, offset, duration, time slot position, symbol position, or subframe position). For example, in some implementations, a parameter (e.g., n_rim) can be used to scramble or generate a reference signal RIM-RS sequence. The length of n_rim can be one bit or multiple bits, depending on the purpose or the function of the RIM-RS. When the first base station (e.g., interfered base station) transmits the RIM-RS for ascertaining the source of the interference, n_rim can be set to 0. When the second base station (e.g., interfering base station) transmits the RIM-RS for determining whether the atmospheric ducting phenomenon still persists, n_rim can be set to 1.

Embodiment 4

This embodiment describes ways for determining when the remote interference mitigation scheme needs to be terminated.

Transmitting reference signals and performing remote interference mitigation schemes add overhead to the communication systems, and may negatively impact system performance. Therefore, mechanisms are needed to terminate the transmission of the reference signals and/or terminate the remote interference mitigation schemes upon determining that remote interferences no longer exist.

Under the Framework-1 as described above, the first base station decides when to terminate the transmission of RS-1 based on whether it receives the RS-2. The second base station decides when to terminate the remote interference mitigation scheme based on whether it receives the RS-1. Under the Framework-2.1 and 2.2, the first base station decides when to terminate the transmission of RS-1 based on the reception of the backhaul signaling from the second base station. The second base station decides when to terminate the remote interference mitigation scheme depending on whether it receives the RS-1. These frameworks rely on either the air interface or the backhaul signaling to control whether the remote interference mitigation scheme should be terminated. Signaling overhead can be increased, as does the difficulty of reference signal design. There also exist problems of signaling loss and/or detection failures.

To address the above-mentioned problems, the second base station may adopt a timer to control the time length of the remote interference mitigation scheme. For example, when the timer reaches a threshold or expires, the second base station terminates the remote interference mitigation scheme and/or restores the original configurations.

In some embodiments, when the value of the timer is greater than or equal to the threshold, the second base station terminates the remote interference mitigation scheme even if it does not receive any RS-1. In some embodiments, if the value of the timer is smaller than the threshold, the second base station continues to execute the Remote interference mitigation scheme even when it receives the RS-1.

For example, after receiving the reference signal RS-1 (RIM-RS) from the first base station, the second base station performs a remote interference mitigation scheme and starts a timer. Because the atmospheric ducting phenomenon typically lasts for several hours or longer, the threshold can be configured for a long period of time, such as one hour. When the timer exceeds one hour, the second base station stops executing the remote interference mitigation scheme and/or restores the original configuration.

After the second base station terminates the remote interference mitigation scheme, if there is no longer any atmospheric ducting phenomenon, the RIM process ends. If the atmospheric ducting phenomenon still exists, the second base station will be interfering the first base station again. The first base station then triggers the transmission of the RS-1 (RIM-RS), and the second base station will re-execute the remote interference mitigation scheme. The first base station can stop transmitting the reference signal RS-1 (RIM-RS) by measuring and analyzing noise such as Interference over Thermal (IoT) to determine that it is no longer subject to remote interference.

In general, the first base station needs to transmit RS-1 even if there is no remote interference detected. This is because even though there is no remote interference due to the execution of the remote interference mitigation scheme, the atmospheric ducting phenomenon may persist. If the first base station stops transmitting RS-1 at this point, the second base station will stop executing the remote interference mitigation scheme, which in turn will cause the remote interference to occur again because atmospheric ducting phenomenon persists. However, using the techniques described above, this "ping-pong" problem can be eliminated because the determination of terminating the remote interference mitigation scheme does not depend on the reception of the reference signals (e.g., RIM-RS).

Embodiment 5

Due to the atmospheric ducting phenomenon, the interferences experienced by the first base station (e.g., interfered base station) may come from a second base station (e.g., interfering base station) that is several hundred kilometers away. Correspondingly, the second base station receives the reference signal RIM-RS from the first base station hundreds of kilometers away (the first base station may also receive the RIM-RS from the second base station). Assuming that the distance between the base stations is 300 kilometers, the corresponding coverage area (using the distance as a radius) can be over 200,000 square kilometers. There may be hundreds or even thousands of base stations within this coverage area.

If the second base station can identify which base station transmitted the RIM-RS, it can perform the remote interference mitigation scheme more effectively. For example, it can select a downlink transmission beam that has no interference, adjust the station height, or adjust the antenna downtilt, etc. However, to accurately pinpoint which base station transmitted the RIM-RS, the RIM-RS needs to carry an identifier (ID) for the base station. In some cases, the identifier needs about 20 bits or more to traverse all base stations or cell IDs in the overage area. The length of the identifier can increase the complexity of the RIM-RS design and challenge the detection performance of the RIM-RS. It has been proposed to include a set ID in the RIM-RS to identify base stations within the same set (or within the same cluster). However, after the second base station receives the RIM-RS carrying the set ID, it can only identify which set of base stations transmitted the RIM-RS without the ability to accurately identify which base station within the set performed the transmission. Therefore, without the accurate information of the transmitting base station, the corresponding interference mitigation scheme performed by the second base station may be less effective.

The following scheme can be used to solve the above problems:

1. The first base station transmits a RIM-RS, and the RIM-RS carries the set ID of the set of base stations to which the first base station belongs. For example, the first base station and other base stations belong to Set 1 (identified as Set_1_ID). The RIM-RS transmitted by the first base station (or any other base stations that are in Set 1) can carry Set_1_ID. The set ID can be carried by the scrambling sequence, generation sequence, transmission period, offset, subframe information/slot information, or other types of information for the RIM-RS.

2. After receiving the RIM-RS, the second base station identifies which base station set transmitted the RIM-RS (e.g., Set 1). The second base station (or the set of base stations that the second base station belongs to, e.g., Set 2) transmits a backhaul signaling message (e.g., a X2/Xn interface signaling or S1/NG signaling) to Set 1 or the central node of Set 1. The signaling message includes at least one of the following: a confirmation for the reception of the RIM, a request for the first base station identifier, and/or information regarding the time-frequency domain resources used by the RIM-RS transmission.

3. After Set 1 or the central node of Set 1 receives the above information and/or requests from the second base station, Set 1 can perform transmissions using one of the following methods:

Method 1: Set 1 or the central node of Set 1 transmits the ID information of the first base station to the second base station or Set 2 using the backhaul (e.g., via X2/Xn interface signaling or S1/NG signaling). The ID information of the first base station may be a worldwide unique base station ID (such as cell global identity), a carrier-wide unique base station ID (such as Cell Identity), a gNB/eNB ID, or an ID in Set 1.

Method 2: The first base station transmits the RIM-RS again. The RIM-RS now carries only the identifier of the first base station.

In some embodiments, to avoid confusion caused by having the same base station IDs in different sets, the base stations of other sets can be coordinated to stop transmitting RIM-RSs at the same time. In some implementations, base stations in different sets can schedule the RIM-RS using the time-frequency resources according to information provided by the second base station.

In some embodiments, to avoid confusion between the set ID and the ID of the base station within a set, the RIM-RS can be distinguished using different scrambling code sequences or generating sequences. For example, using Method 2, the set ID can be determined by the first transmission of the RIM-RS, and the base station ID within the set can be determined by the second transmission of the RIM, thereby obtaining an accurate identification of the transmitting base station.

Figure 13:
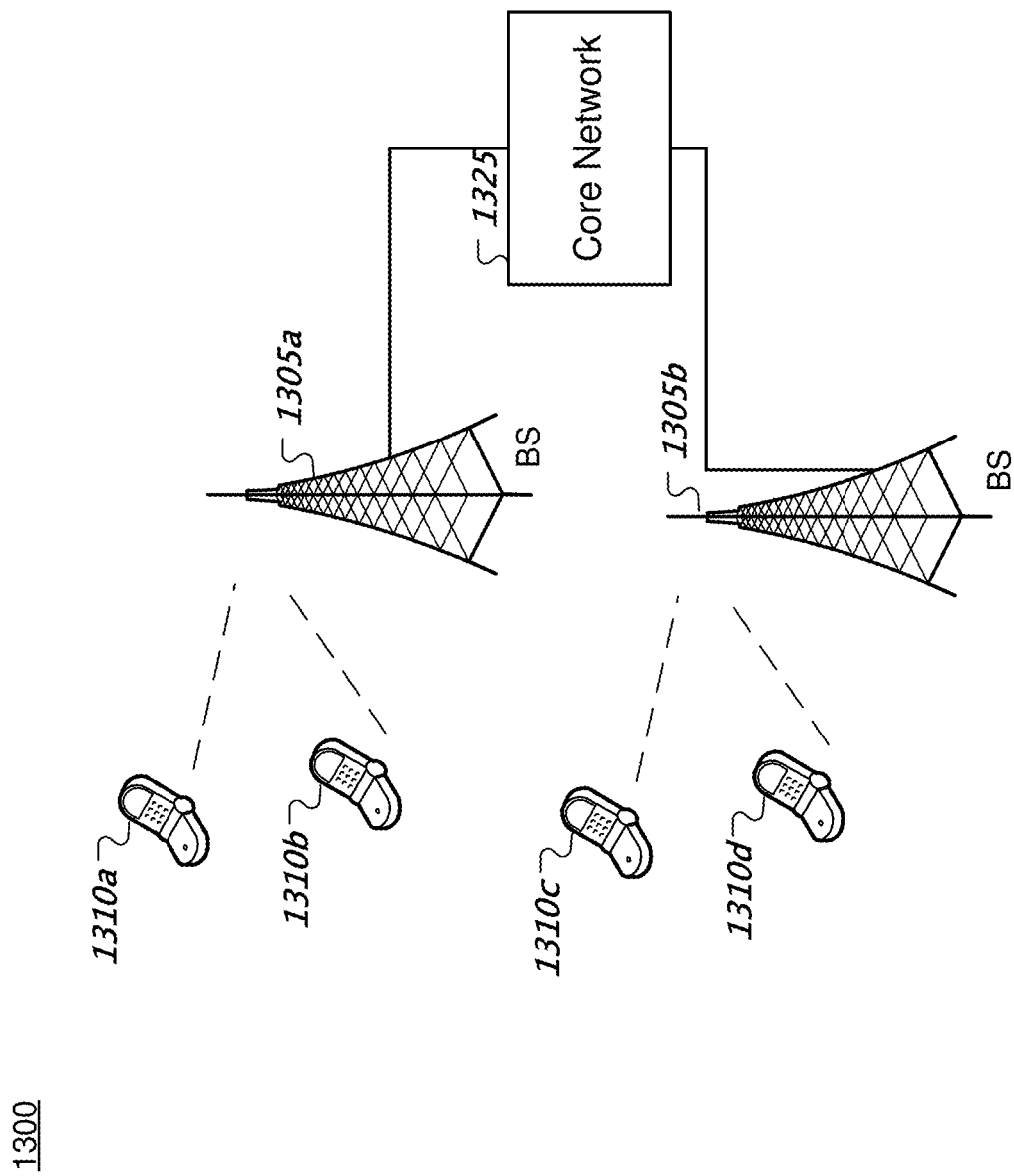
FIG. 13 shows an example of a wireless communication system where techniques in accordance with one or more embodiments of the present technology can be applied.

FIG. 13 shows an example of a wireless communication system 1300 where techniques in accordance with one or more embodiments of the present technology can be applied. A wireless communication system 1300 can include one or more base stations (BSs) 1305a, 1305b, one or more wireless devices 1310a, 1310b, 1310c, 1310d, and a core network 1325. A base station 1305a, 1305b can provide wireless service to wireless devices 1310a, 1310b, 1310c and 1310d in one or more wireless sectors. In some implementations, a base station 1305a, 1305b includes directional antennas to produce two or more directional beams to provide wireless coverage in different sectors.

The core network 1325 can communicate with one or more base stations 1305a, 1305b. The core network 1325 provides connectivity with other wireless communication systems and wired communication systems. The core network may include one or more service subscription databases to store information related to the subscribed wireless devices 1310a, 1310b, 1310c, and 1310d. A first base station 1305a can provide wireless service based on a first radio access technology, whereas a second base station 1305b can provide wireless service based on a second radio access technology. The base stations 1305a and 1305b may be co-located or may be separately installed in the field according to the deployment scenario. The wireless devices 1310a, 1310b, 1310c, and 1310d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 14:
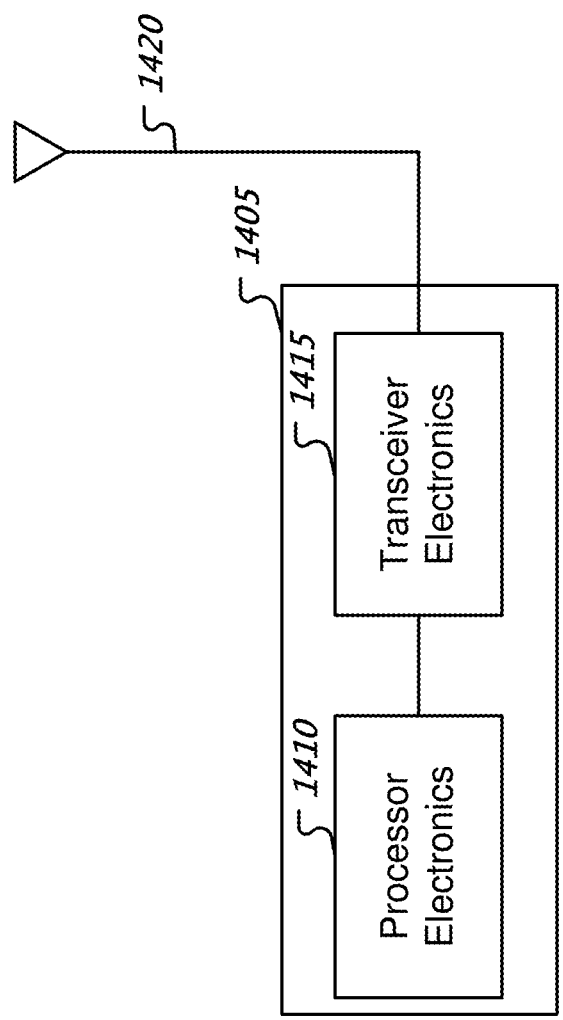
FIG. 14 is a block diagram representation of a portion of a radio station in accordance with one or more embodiments of the present technology can be applied.

FIG. 14 is a block diagram representation of a portion of a radio station. A radio station 1405 such as a base station or a wireless device (or UE) can include processor electronics 1410 such as a microprocessor that implements one or more of the wireless techniques presented in this document. The radio station 1405 can include transceiver electronics 1415 to send and/or receive wireless signals over one or more communication interfaces such as antenna 1420. The radio station 1405 can include other communication interfaces for transmitting and receiving data. Radio station 1405 can include one or more memories (not explicitly shown) configured to store information such as data and/or instructions. In some implementations, the processor electronics 1410 can include at least a portion of the transceiver electronics 1415. In some embodiments, at least some of the disclosed techniques, modules or functions are implemented using the radio station 1405.

It will be appreciated that the present document discloses techniques that can be embodied into wireless communication systems to allow the wireless communication nodes to effectively mitigate remote interferences without noticeable impact on the system performance.

In one example aspect, a wireless communication method is disclosed. The method includes receiving, at a first communication node, information that includes one or more parameters indicating a time-domain characteristic of one or more interfered symbols due to a remote interference between the first communication node and a second communication node. The method also includes performing, by the first communication node, subsequent communications based on the information.

In some embodiments, the method includes receiving, at the first communication node, a reference signal from the second communication node indicating the remote interference. In some embodiments, the reference signal carries a first identifier that identifies a communication node set to which the second communication node belongs. In some implementations, the method includes receiving, at the first communication node, information from the communication node set indicating a second identifier that identifies the second communication node within the communication node set. In some implementations, the method includes receiving, at the first communication node, the reference signal again from the second communication node, the reference signal carrying a second identifier that identifies the second communication node within the communication node set.

In some embodiments, the first communication node and the second communication agree to operate using a maximum downlink transmission boundary and a maximum uplink transmission boundary within a downlink-uplink switching period. The one or more parameters include a first parameter and a second parameter, the first parameter indicating a first time-domain distance between a last downlink symbol configured by the second communication node and the maximum downlink transmission boundary, and the second parameter indicating a second time-domain distance between a first uplink symbol configured by the second communication node and the maximum uplink transmission boundary.

In some embodiments, the time-domain characteristic of the one or more interfered symbols includes at least one of: time-domain locations of the one or more interfered symbols, a number of the one or more interfered symbols, a duration of the one or more interfered symbols, one or more interference levels of the one or more interfered symbols, or a number of symbols to be muted in the subsequent transmissions.

In some embodiments, wherein the information is received via an air interface or a backhaul signaling message.

In some embodiments, performing the subsequent communications includes performing, by the first communication node, an interference mitigation scheme based on the information. In some embodiments, the method includes terminating, by the first communication node, the mitigation scheme.

In some embodiments, performing the mitigation scheme comprises transmitting, by the first communication node, a second reference signal based on a parameter. The parameter indicates that the second reference signal is transmitted for indicating whether an atmospheric ducting phenomenon persists.

In some embodiments, the method includes starting, by the first communication node, a timer for tracking a duration of the interference mitigation scheme; and determining, by first communication node, when the timer expires to terminate the mitigation scheme.

In another example aspect, a wireless communication method includes transmitting, from the first communication node, information that includes one or more parameters indicating a time-domain characteristic of one or more interfered symbols due to a remote interference between the first communication node and a second communication node. The method also includes performing, by the first communication node, subsequent communications in response to the information.

In some embodiments, the method includes transmitting, from the first communication node, a reference signal indicating the remote interference to the second communication node. In some embodiments, the reference signal carries a first identifier that identifies a communication node set to which the first communication node belongs. In some embodiments, the method includes transmitting information indicating a second identifier that identifies the first communication node within the communication node set. In some implementations, the information is transmitted via the communication node set or a central communication node of the communication node set. In some implementations, transmitting the information includes re-transmitting, by the first communication node, the reference signal carrying the second identifier.

In some embodiments, the first communication node and the second communication agree to operate using a maximum downlink transmission boundary and a maximum uplink transmission boundary within a downlink-uplink switching period. The one or more parameters include a first parameter and a second parameter, the first parameter indicating a first time-domain distance between a last downlink symbol configured by the first communication node and the maximum downlink transmission boundary, and the second parameter indicating a second time-domain distance between a first uplink symbol configured by the first communication node and the maximum uplink transmission boundary.

In some embodiments, the time-domain characteristic of the one or more interfered symbols includes at least one of: time-domain locations of the one or more interfered symbols, a number of the one or more interfered symbols, a duration of the one or more interfered symbols, one or more interference levels of the one or more interfered symbols, or a number of symbols to be muted in the subsequent transmissions.

In some embodiments, the information is transmitted via an air interface or a backhaul signaling message.

In another example aspect, a wireless communication method includes observing, by a first communication node, a remote interference between the first communication node and a second communication node. The first communication node operates using a maximum downlink transmission boundary and a maximum uplink transmission boundary within a downlink-uplink switching period that is agreed upon with the second communication node agree on. The method also includes transmitting, by the first communication node, one or more reference signals indicating the remote interference. The one or more reference signals occupy one or more time-domain symbols before the maximum downlink transmission boundary, the one or more time-domain symbols including a downlink symbol, a flexible symbol, or a guard period symbol.

In some embodiments, the one or more reference signals carry a first identifier that identifies a communication node set to which the first communication node belongs. In some embodiments, the method includes transmitting information indicating a second identifier that identifies the first communication node within the communication node set. In some implementations, the information is transmitted via the communication node set or a central communication node of the communication node set. In some implementations, transmitting the information includes re-transmitting, by the first communication node, at least one reference signal of the one or more reference signals, wherein the reference signal carries the second identifier.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A wireless communication method, comprising:
   receiving, at a first communication node, information that includes one or more parameters indicating a time-domain characteristic of one or more interfered symbols due to a remote interference between the first communication node and a second communication node; and
   performing, by the first communication node, subsequent communications based on the information,
   wherein the first communication node and the second communication node agree to operate using a maximum downlink transmission boundary and a maximum uplink transmission boundary within a downlink-uplink switching period, and
   wherein the one or more parameters include a first parameter and a second parameter, the first parameter indicating a first time-domain distance between a last downlink symbol configured by the second communication node and the maximum downlink transmission boundary, and the second parameter indicating a second time-domain distance between a first uplink symbol configured by the second communication node and the maximum uplink transmission boundary.

2. The method of claim 1, comprising:
   receiving, at the first communication node, a reference signal from the second communication node indicating the remote interference, wherein the reference signal carries a first identifier that identifies a communication node set to which the second communication node belongs.

3. The method of claim 2, comprising:
   receiving, at the first communication node, information from the communication node set indicating a second identifier that identifies the second communication node within the communication node set.

4. The method of claim 2, comprising:
   receiving, at the first communication node, the reference signal again from the second communication node, the reference signal carrying a second identifier that identifies the second communication node within the communication node set.

5. The method of claim 1, wherein performing the subsequent communications includes:
   performing, by the first communication node, an interference mitigation scheme based on the information, wherein performing the mitigation scheme comprises:
   transmitting, by the first communication node, a second reference signal based on a parameter, wherein the parameter indicates that the second reference signal is transmitted for indicating whether an atmospheric ducting phenomenon persists.

6. A wireless communication method, comprising:
   transmitting, from the first communication node, information that includes one or more parameters indicating a time-domain characteristic of one or more interfered symbols due to a remote interference between the first communication node and a second communication node; and performing, by the first communication node, subsequent communications in response to the information, wherein the first communication node and the second communication agree to operate using a maximum downlink transmission boundary and a maximum uplink transmission boundary within a downlink-uplink switching period, and wherein the one or more parameters include a first parameter and a second parameter, the first parameter indicating a first time-domain distance between a last downlink symbol configured by the first communication node and the maximum downlink transmission boundary, and the second parameter indicating a second time-domain distance between a first uplink symbol configured by the first communication node and the maximum uplink transmission boundary.

7. The method of claim 6, comprising:
transmitting, from the first communication node, a reference signal indicating the remote interference to the second communication node, wherein the reference signal carries a first identifier that identifies a communication node set to which the first communication node belongs.

8. The method of claim 7, comprising:
transmitting information indicating a second identifier that identifies the first communication node within the communication node set.

9. The method of claim 7, wherein transmitting the information comprises:
re-transmitting, by the first communication node, the reference signal carrying the second identifier.

10. The method of claim 6, wherein the time-domain characteristic of the one or more interfered symbols includes at least one of: time-domain locations of the one or more interfered symbols, a number of the one or more interfered symbols, a duration of the one or more interfered symbols, one or more interference levels of the one or more interfered symbols, or a number of symbols to be muted in the subsequent transmissions.

11. A wireless communication apparatus, comprising a processor configured to:
receive information that includes one or more parameters indicating a time-domain characteristic of one or more interfered symbols due to a remote interference between the apparatus and a second communication node; and performing subsequent communications based on the information, wherein the first communication node and the second communication node agree to operate using a maximum downlink transmission boundary and a maximum uplink transmission boundary within a downlink-uplink switching period, and wherein the one or more parameters include a first parameter and a second parameter, the first parameter indicating a first time-domain distance between a last downlink symbol configured by the second communication node and the maximum downlink transmission boundary, and the second parameter indicating a second time-domain distance between a first uplink symbol configured by the second communication node and the maximum uplink transmission boundary.

12. The apparatus of claim 11, wherein the processor is configured to:

receive a reference signal from the second communication node indicating the remote interference, wherein the reference signal carries a first identifier that identifies a communication node set to which the second communication node belongs.

13. The apparatus of claim 12, wherein the processor is further configured to:
receive information from the communication node set indicating a second identifier that identifies the second communication node within the communication node set.

14. The apparatus of claim 12, wherein the processor is further configured to:
receive the reference signal again from the second communication node, the reference signal carrying a second identifier that identifies the second communication node within the communication node set.

15. The apparatus of claim 11, wherein the processor is configured to perform the subsequent communications by:
perform an interference mitigation scheme based on the information, wherein performing the mitigation scheme comprises:
transmitting a second reference signal based on a parameter, wherein the parameter indicates that the second reference signal is transmitted for indicating whether an atmospheric ducting phenomenon persists.

16. A wireless communication apparatus, comprising a processor configured to:
transmit information that includes one or more parameters indicating a time-domain characteristic of one or more interfered symbols due to a remote interference between the first communication node and a second communication node; and perform subsequent communications in response to the information, wherein the first communication node and the second communication agree to operate using a maximum downlink transmission boundary and a maximum uplink transmission boundary within a downlink-uplink switching period, and wherein the one or more parameters include a first parameter and a second parameter, the first parameter indicating a first time-domain distance between a last downlink symbol configured by the first communication node and the maximum downlink transmission boundary, and the second parameter indicating a second time-domain distance between a first uplink symbol configured by the first communication node and the maximum uplink transmission boundary.

17. The apparatus of claim 16, wherein the processor is configured to:
transmit a reference signal indicating the remote interference to the second communication node, wherein the reference signal carries a first identifier that identifies a communication node set to which the first communication node belongs.

18. The apparatus of claim 17, wherein the processor is configured to:
transmit information indicating a second identifier that identifies the first communication node within the communication node set.

19. The apparatus of claim 17, wherein the processor is configured to transmit the information by re-transmitting the reference signal carrying the second identifier.

20. The apparatus of claim 16, wherein the time-domain characteristic of the one or more interfered symbols includes at least one of: time-domain locations of the one or more interfered symbols, a number of the one or more interfered symbols, a duration of the one or more interfered symbols, one or more interference levels of the one or more interfered symbols, or a number of symbols to be muted in the subsequent transmissions.

* * * * *